United States Patent
Greene et al.

(10) Patent No.: US 11,375,562 B2
(45) Date of Patent: Jun. 28, 2022

(54) METHODS AND APPARATUS FOR ASSESSING A CABLE CONNECTION

(71) Applicant: Charter Communications Operating, LLC

(72) Inventors: Gregory Greene, Littleton, CO (US); Stephen Bartlett, Castle Pines, CO (US); Wen-Yen Picard Huang, Englewood, CO (US); David L. Temlak, Hudson, MA (US)

(73) Assignee: Charter Communications Operating, LLC, St. Louis, MO (US)

( * ) Notice: Subject to any disclaimer, the term of this patent is extended or adjusted under 35 U.S.C. 154(b) by 44 days.

(21) Appl. No.: 16/818,695

(22) Filed: Mar. 13, 2020

(65) Prior Publication Data

US 2021/0289573 A1    Sep. 16, 2021

(51) Int. Cl.
| | |
|---|---|
| *H04L 12/26* | (2006.01) |
| *H04W 76/15* | (2018.01) |
| *H04L 27/34* | (2006.01) |
| *H04B 17/391* | (2015.01) |
| *H04B 17/336* | (2015.01) |
| *H04B 17/318* | (2015.01) |

(52) U.S. Cl.
CPC .......... *H04W 76/15* (2018.02); *H04B 17/318* (2015.01); *H04B 17/336* (2015.01); *H04B 17/391* (2015.01); *H04L 27/3494* (2013.01)

(58) Field of Classification Search
CPC .. H04B 17/318; H04B 17/336; H04B 17/391; G06F 8/61; G06F 16/22; H04L 12/26; H04L 27/3494; H04L 67/1097; H04W 76/10; H04W 76/14; H04W 76/15; H04W 24/08; H04W 28/16; H04W 84/12
See application file for complete search history.

(56) References Cited

U.S. PATENT DOCUMENTS

| | | | |
|---|---|---|---|
| 10,271,351 | B1 | 4/2019 | Wang |
| 10,980,025 | B2 * | 4/2021 | Hmimy ............. H04W 72/0453 |
| 11,016,128 | B2 * | 5/2021 | Magno .................... G08B 29/06 |
| 2012/0129551 | A1 | 5/2012 | Islam |
| 2012/0220240 | A1 * | 8/2012 | Rothschild ............. H04B 17/29 455/67.11 |
| 2021/0227628 | A1 * | 7/2021 | Sevindik ............... H04W 88/06 |
| 2021/0259032 | A1 * | 8/2021 | Selea .................. H04L 67/1097 |
| 2021/0329467 | A1 | 10/2021 | Sevindik |
| 2021/0337391 | A1 | 10/2021 | Sevindik |

* cited by examiner

*Primary Examiner* — Frank Duong
(74) *Attorney, Agent, or Firm* — Gazdzinski & Associates, PC

(57) ABSTRACT

Apparatus and methods for testing a cable connection in order to determine whether the cable connection can adequately support delivery of one or more services delivered from a service provider infrastructure. In one embodiment, the methods and apparatus are adapted to detect RF signals on a coaxial cable connection or outlet within a premises, evaluate the signals, and determine the readiness status thereof based on the evaluation. In one variant, an algorithm is used for the evaluation of the RF signals, and is dependent on at least a geographical location of the cable outlet being tested. The algorithm evaluates a list of prospective RF channels for signal strength so as to correlate or exclude any signals present from one or more types of sources (e.g., OTA broadcasts, satellite service providers, etc.).

20 Claims, 25 Drawing Sheets

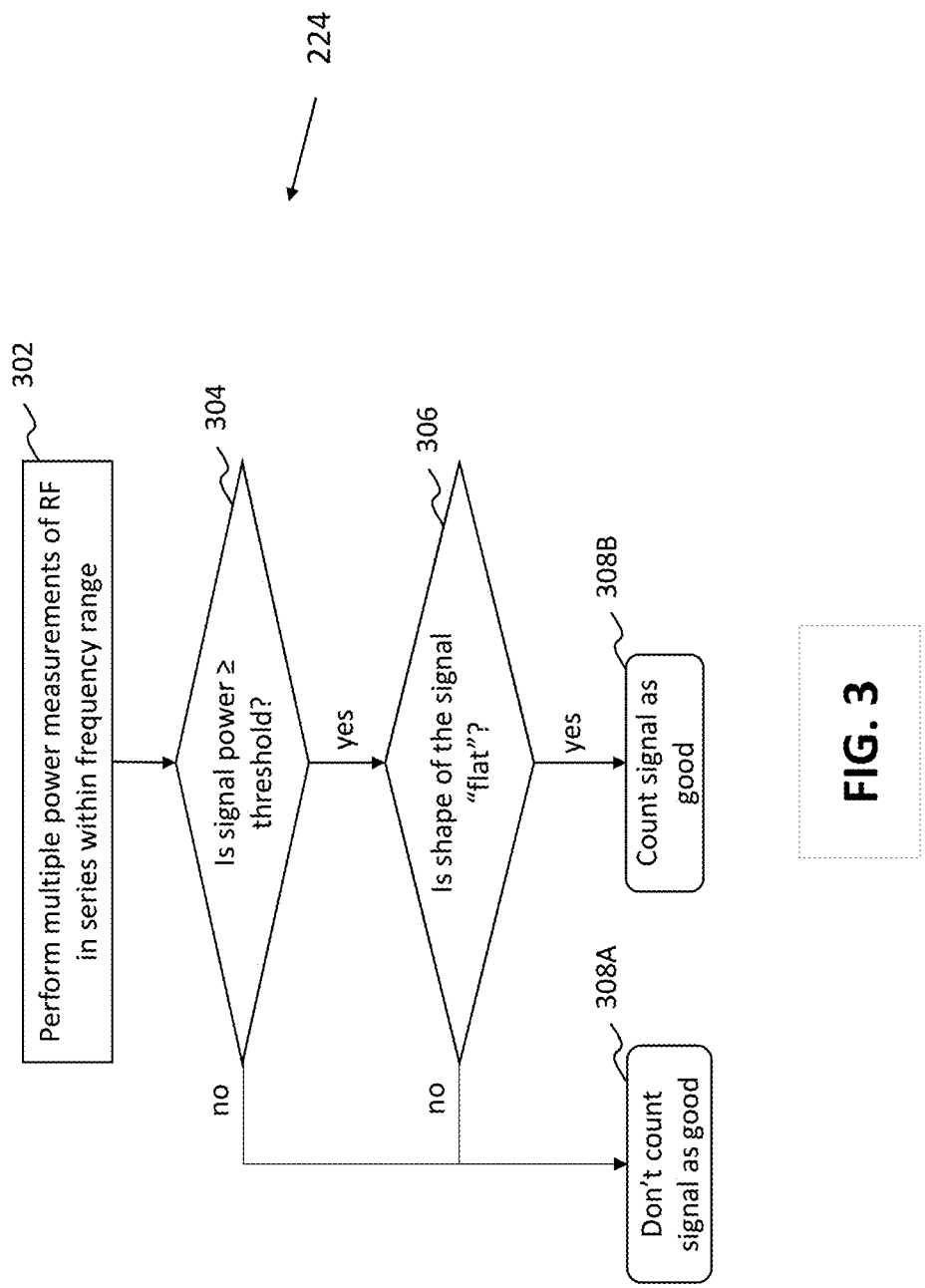

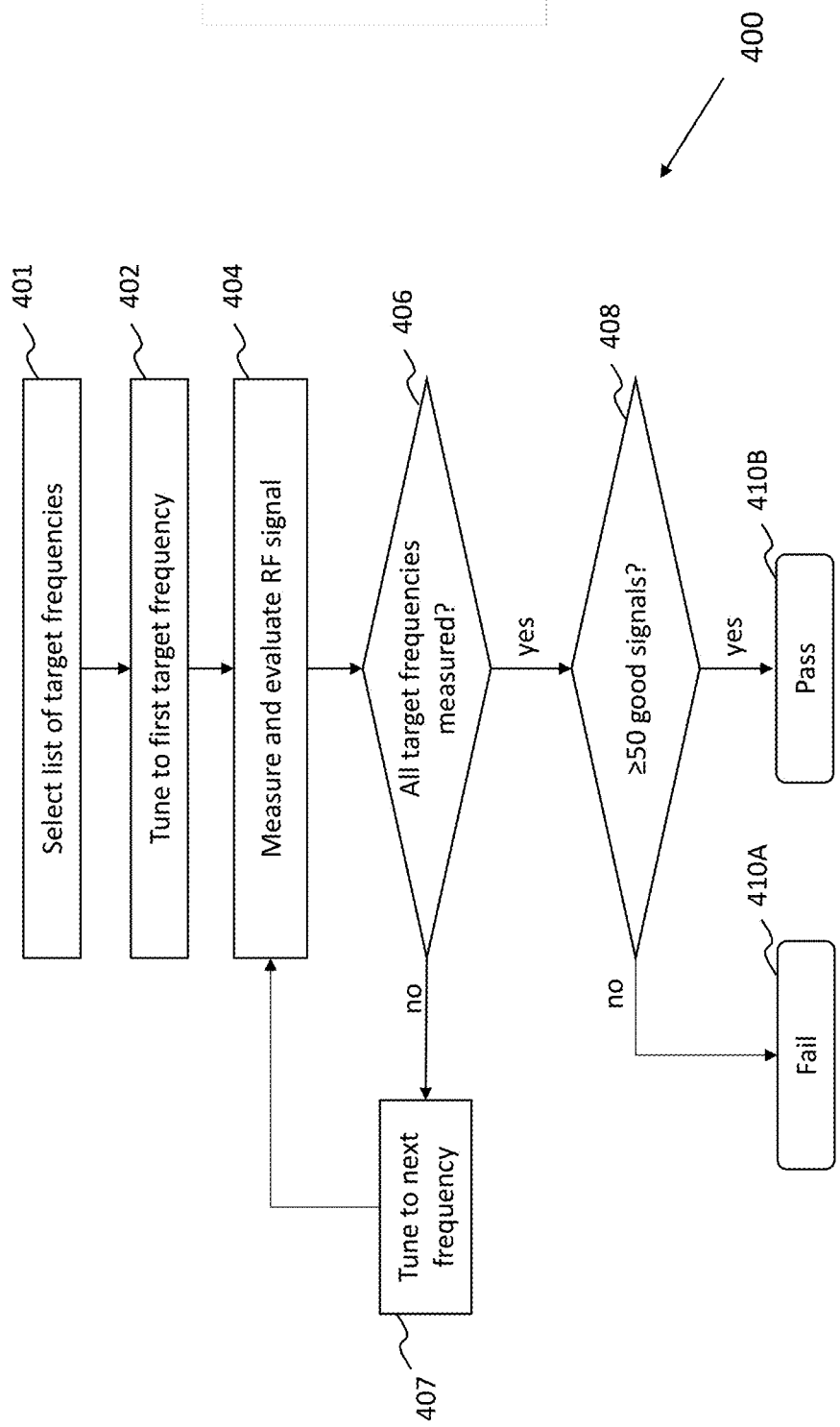

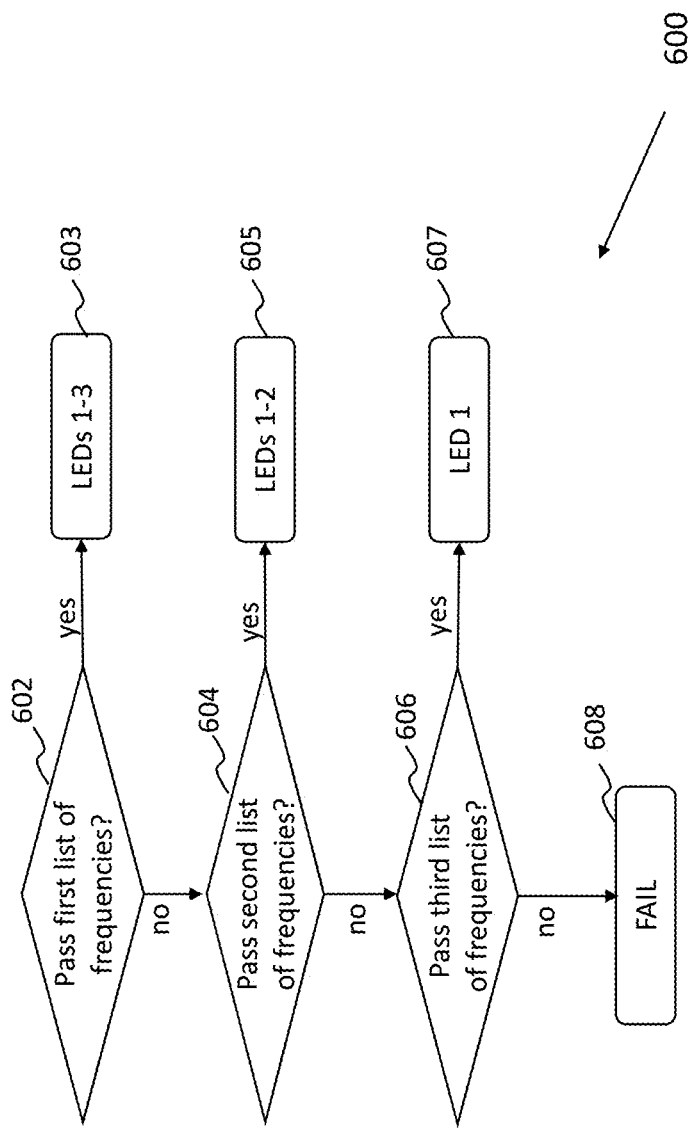

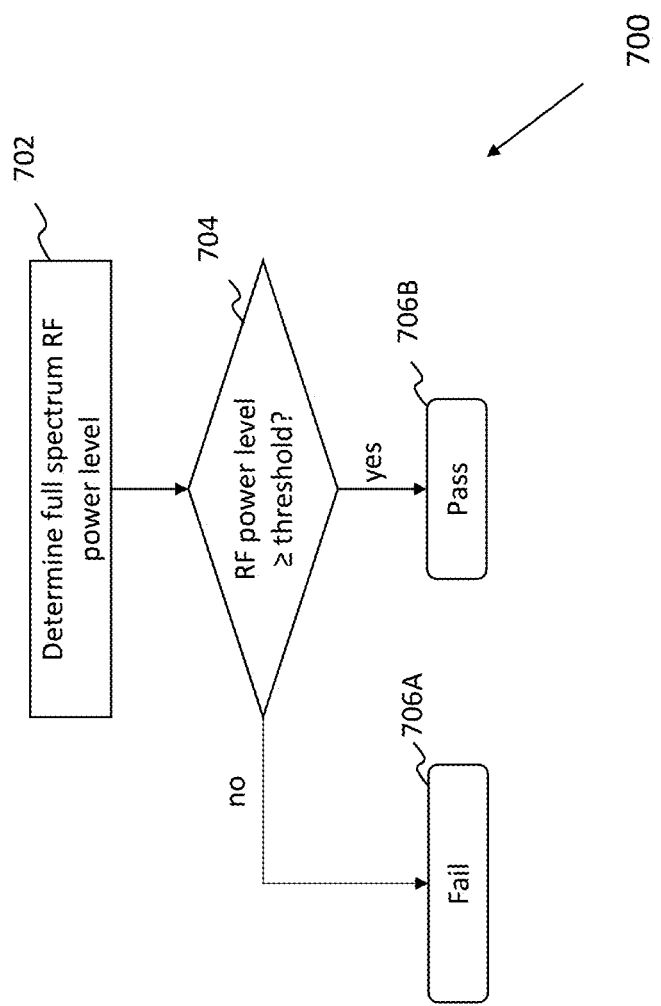

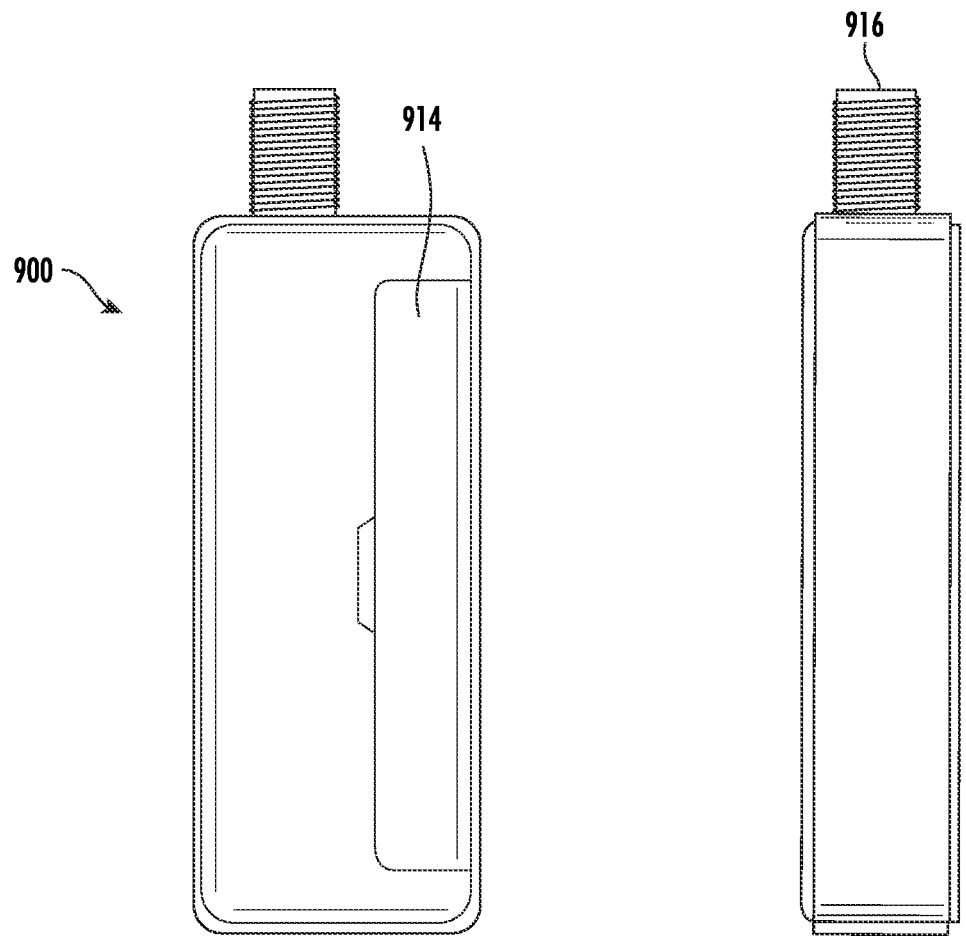

METHODS AND APPARATUS FOR ASSESSING A CABLE CONNECTION

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of network cable connections, and specifically in one exemplary aspect, detection and characterization of RF (radio frequency) signals present on or delivered over such cable connections.

2. Description of Related Technology

Under existing content distribution paradigms, network operators deliver data services (e.g., broadband), video products, and so-called "OTT" (over-the-top) content services to customers using a variety of different devices, thereby enabling their users or subscribers to access data/content in a number of different contexts, both fixed (e.g., at their residence) and mobile (such as while traveling or away from home).

Referring now to FIG. 1, a typical managed content distribution network (e.g., cable network) architecture is described. As shown in FIG. 1, the architecture 101 comprises one or more headend portions 102 which may include a conditional access system (CAS) and a multiplexer-encrypter-modulator (MEM) coupled to an HFC network having fiber network 104 and coaxial cable network 110 portions coupled via fiber nodes 108. The network 101 is adapted to process or condition content for transmission over the network to a plurality of service nodes 112 and ultimately client devices or CPE (consumer premises equipment) 106. Information is carried across multiple information channels created within the architecture. Thus, the headend must be adapted to acquire the information for the carried channels from various sources. Typically, the channels being delivered from the headend 102 to the CPE 106 ("downstream") are multiplexed together in the headend, and sent to neighborhood hubs 112 via the interposed network components.

In such networks, data/content delivery may be specific to the network operator, such as where video content is ingested by the network operator or its proxy, and delivered to the network users or subscribers as a product or service of the network operator. For instance, a cable multiple systems operator (MSO) may ingest content from multiple different sources (e.g., national networks, content aggregators, etc.), process the ingested content, and deliver it to the MSO subscribers via their hybrid fiber coax (HFC) cable/fiber network, such as to the subscriber's set-top box or DOCSIS cable modem. Such ingested content is transcoded to the necessary format as required (e.g., MPEG-2 or H.264/AVC or H.265/HEVC), framed and placed in the appropriate media container format ("packaged"), transmitted via e.g., statistical multiplex into a multi-program transport stream (MPTS) on 6 MHz radio frequency (RF) channels for receipt by the subscribers via RF tuners, de-multiplexed and decoded, and rendered on the users' rendering devices (e.g., digital TV) according to the prescribed coding format.

Within the cable plant, VOD and so-called switched digital video (SDV) may also be used to provide content, and via utilization of a single-program transport stream (SPTS) delivery modality. In U. S. cable systems for example, downstream RF channels used for transmission of television programs are 6 MHz wide, and occupy a multitude of 6-MHz spectral slots between 54 MHz and 860 MHz. Upstream and "out of band" communications are normally relegated to the lower end of the available spectrum, such as between 5 and 85 MHz. Deployments of VOD services have to share this spectrum with already established analog and digital cable television services such as those described above. Within a given cable plant, all homes that are electrically connected to the same cable feed running through a neighborhood will receive the same downstream signal. For the purpose of managing e.g., VOD services, these homes are grouped into logical groups typically called Service Groups. Homes belonging to the same Service Group receive their VOD service on the same set of RF channels.

VOD service is typically offered over a given number (e.g., 4) of RF channels from the available spectrum in cable. Thus, a VOD Service Group consists of homes receiving VOD signals over the same 4 RF channels.

In most cable networks, programs are transmitted using MPEG (e.g., MPEG-2) audio/video compression. Since cable signals are transmitted using a Quadrature Amplitude Modulation (QAM) scheme, available payload bitrate for typical modulation rates (e.g., QAM-256) used on HFC systems is roughly 38 Mbps. For example, in many VOD deployments, a typical rate of 3.75 Mbps is used to send one video program at resolution and quality equivalent to NTSC broadcast signals. In digital television terminology, this is called Standard Definition (SD) television resolution. Therefore, use of MPEG-2 and QAM modulation enables carriage of 10 SD sessions on one RF channel (10×3.75=37.5 Mbps<38 Mbps). Since a typical Service Group consists of 4 RF channels, 40 simultaneous SD VOD sessions can be accommodated within a Service Group.

Entertainment-quality transmission of HD (High Definition) signals requires about four times as much bandwidth as transmission of SD signals. For an exemplary MPEG-2 Main Profile—High Level (MP@HL) video compression, each HD program requires around 15-Mbps bitrate. New UHD and similar encodings require even higher data rates and demand high-order modulation and coding schemes (MCS) such as QAM-256.

Hence, in sum, existing U.S. cable systems utilize what in effect amounts to an FDM system with 6 MHz channels and roughly 700 MHz of available bandwidth capacity in total, each of the channels being QAM modulated and delivered to the end user via e.g., a tree-and-branch type of topology, with user's CPE (e.g., digital settop boxes, DOCSIS modems, and gateways) utilizing RF tuners to tune to the appropriate DS channels to receive their respective data or program streams. European cable systems typically utilize 8 MHz channels but generally similar modulation and distribution schemes, by comparison.

New initiatives aimed at utilizing broader portions of the RF spectrum on the cable (e.g., up to 1.2 GHz or even 1.6 GHz and beyond) are also forthcoming.

Moreover, with increasing demand for coverage by broadband networking services (including to more rural areas which may not be serviced by the aforementioned coaxial cable systems), there is an increasing amount of wireless equipment that is being deployed for servicing such demand, including via delivery using CBRS or other quasi-licensed or unlicensed spectrum which is backhauled by extant cable MSO infrastructure. One way in which broadband wireless services are provided, including at network edges (e.g., in rural areas), is by use of CBRS Fixed Wireless Access (FWA) devices. A high-level diagram showing a typical FWA device installation on a consumer premises is shown in FIG. 1B. Using such installations, a cable operator (aka "MSO" or multiple systems operator) can further expand its customer base and coverage footprint, including to previously un-served or under-served markets.

Unaddressed Issues of Service Provision

When a managed (e.g., cable) network content provider wants to provide digital content services to a customer at a customer premises (e.g., house, office, enterprise, campus, etc.), there is not always an easy or reliable way to determine whether any or all of the cable outlets at the customer premises are actually connected to the cable network of that particular content provider and, if so, whether the connection is of sufficient quality to support delivery of the desired services. For example, a given cable outlet may lead to an open or shorted cabling system, be connected to a satellite dish, be connected to MoCA infrastructure (but not the service provider's delivery network), or be connected a TV antenna (such as a roof-mounted antenna).

Further, some cable outlets at a customer premises might have a good connection to the service provider's cable delivery network, while others do not.

Additionally, even when connected, interference with or degradation of the cabling or connections within the signal path may render the installation useless for certain types of services; e.g., "noisy" cables or degraded F-type connectors or degraded cable insulation may produce poor results (including those below a prescribed value set forth in the customer's SLA or Service Level Agreement) if services are ultimately delivered. Nearly as frustrating as an inability to obtain services is the provision of poor quality services (i.e., poor user experience, such as e.g., low Internet data rates, pixelation of video, slow response on user-initiated commands or requests), which can significantly degrade a customer's perceptions of the service provider as well as brand loyalty.

Typical current paradigms for service provision by such providers predominantly fall into two categories; i.e., either (i) sending service provider personnel (e.g., technicians or installers) to the premises to attempt the installation, or (ii) directly mailing "self-install" kits to potential customers without first knowing whether a viable connection to the cable network is even available at the customer's premises.

Sending service provider personnel to every customer premises (aka a "truck roll") is very expensive in terms of MSO resources, and necessarily involve a great deal of latency (and sometimes user frustration due to scheduling windows, need to be at the premises during the installation, etc.).

Direct mail of self-install kits does have utility from both the perspective of reducing the required number of truck rolls and user scheduling issues; however, if none of the cable outlets at the customer premises are viable, this approach turns out to be a waste of time and money for both the potential customer and the service provider. This is also true under the truck roll paradigm; sending a technician or installer to a premises without knowing whether any viable cable outlets exist is non-optimal, since e.g., the installer may not be able to remedy the deficiencies (e.g., there may be a need to route new coaxial cabling within the premises, relocate devices such as NIDs (network interface devices or terminal boxes), or perform other types of repairs or improvements which the installer may not be able to complete (at least on a single visit).

Additionally, current methods of assessing the viability of cable outlet connections are either "binary" in nature (e.g., go/no-go only as to a presence or absence of an RF signal), or alternatively require complicated devices and/or certain levels technical expertise which are only reasonably within the realm of service provider technical or trained installation personnel.

Accordingly, it would be highly beneficial to know in advance of any installer visits or utilization of customer self-install kits whether a particular customer premises is: (i) connected to the service provider network (in a general sense); (ii) has connectivity for one or more desired rooms or locations within the premises (e.g., the living room cable outlet may be connected, but the master bedroom is not); and (iii) if the connections or outlets of interest can support the network services being installed.

Thus, improved methods and apparatus are needed to address the foregoing issues. Specifically, methods and apparatus are needed that would allow a person of no or limited technical skill to easily determine whether any given cable or other signal delivery outlet is viable for connection to a service provider network.

SUMMARY

The present disclosure meets at least the foregoing needs by providing, inter alia, methods and apparatus for testing outlets or cable connections to determine whether the outlet or connection is able to support services of a service provider.

In one aspect of the disclosure, an electronic apparatus configured to evaluate a viability of cable outlets for supporting services from a network service provider is disclosed. In one embodiment, the electronic apparatus includes a cable outlet interface (e.g., F-type connector) configured to connect to a cable outlet, and a cable status indicator (e.g., pass/fail indicator).

In one variant, the cable status indicator includes a single LED configured to indicate viable cable connection (pass) with a first color light, a non-viable cable connection (fail) with a second color light, and a test in progress with a third color light and/or a blinking light. In one implementation, the first color light is green, the second color light is red, and the third color light is amber or yellow.

In another variant, the status indicator includes a plurality of LEDs configured to indicate whether a cable outlet connection is viable and an approximate RF spectrum power level detected by the apparatus. The approximate power level can, in one variant, indicate the confidence of the cable viability determination (i.e., higher RF spectrum power indicates an ostensibly better connection or higher SNR). In one implementation, the plurality of LEDs includes ten LEDs arranged in a row and optionally labeled with associated (graduated) power levels or relative scale such as "1 through 10".

In one variant, the cable status indicator includes an audio output. In one implementation, the audio output may include different tones configured to indicate a status of the cable outlet. For instance, the audio output may use a single tone to indicate a viable outlet, and multiple tones (or different frequency tone) to indicate non-viable outlet. In another implementation, the audio output may use an upward changing tone to indicate a viable outlet and a downward changing tone to indicate a non-viable outlet. In yet another implementation, the audio output may include spoken words (e.g., "good connection" and "bad connection").

In one embodiment, the electronic test apparatus further includes a power source, a power ON/OFF indicator, and a power ON/OFF switch. In one variant, the power source is a replaceable battery. In another variant, the power source is a rechargeable power source configured to allow wireless (e.g. via electromagnetic induction) or wired (e.g., via USB or mini-USB connection) charging.

In one variant, the electronic apparatus is a passive device configured to detect radiofrequency (RF) signals, and not configured to actively send any RF signals/pulses. In other variants, the apparatus includes RF signal generation circuitry configured to generate prescribed RF-band signals, such as to enable the testing of cabling within a given premises for continuity or connectivity.

In another embodiment, the electronic apparatus includes at least one RF signal detector and a processing apparatus with logic configured to: evaluate a plurality of signals using the at least one RF signal detector and, based on the evaluation, determine whether the cable outlet can support provision of services from a content provider network at a predetermined level of quality. In one variant, the logic is configured to filter out at least one portion of the available RF spectrum from the input of the electronic apparatus prior to evaluating the plurality of RF frequencies.

In another aspect of the disclosure, a method of testing a connection or outlet is disclosed. In one embodiment, the testing includes scanning and evaluating only a predetermined set of frequencies of an available RF spectrum. In one variant, the predetermined set of frequencies includes channel frequencies associated with channels used by a cable network content provider. The set of frequencies includes for instance a predetermined number of frequencies N, and may exclude at least some channel frequencies associated with other types of services, e.g. frequencies of channels known to be used by satellite TV providers or over the air (OTA) TV.

In another variant, the predetermined set of frequencies is selected based on a geographical region/market of the premises in which the cable outlet is located. The predetermined set of frequencies can correspond for example to frequency channels known to be used by the cable network content provider in the geographical region/market. In one implementation, the predetermined number of frequencies N varies with the geographical region.

In one embodiment, the evaluation of each of the plurality of RF frequencies includes: taking a plurality of RF power measurements at a particular frequency; comparing the power measurements against a predetermined threshold power; characterizing the signal profile using the power measurements; and determining whether the signal on the frequency is acceptable or not.

In one variant, taking measurements at a particular frequency includes taking measurements within a prescribed range around a centerline or nominal frequency. In one implementation, the range is 6 MHz or 8 MHz in total bandwidth. In another implementation, the range is 4 MHz, in order to, e.g. cut off edge or sideband regions. In another implementation, the prescribed ranges are constructed to avoid consideration of guard-bands between consecutive prescribed carriers.

In another variant, the plurality of power measurements are taken for a predetermined time period at predetermined time intervals. In one such implementation, the time period and/or the time intervals are based on the frequency being evaluated (e.g. measurement interval as a function of frequency being measured).

In another such implementation, the predetermined number of readings is taken for each frequency (e.g., N readings taken at each frequency). In other implementations, the number of readings depends on the particular frequency (e.g., N is a function of frequency).

In another embodiment, comparing the power measurements against a predetermined threshold power includes taking an average of all the readings taken at a given frequency, and comparing the average thereof against a predetermined threshold power. The predetermined threshold power may be the same for every frequency channel, or vary with the frequency channel being evaluated.

In a further embodiment, comparing the power measurements against the predetermined threshold power includes taking an average of some, but not all, of the readings taken at a given frequency and comparing the average against the predetermined threshold power. In some variants, readings might be discarded/ignored if they are determined to be statistical outliers, too low, or meet other such criteria.

In one embodiment, the characterizing of the signal profile includes determining whether the signal is sufficiently "flat." In one variant, such flatness is determined by subtracting the lowest power measurement at the frequency from the highest power measurement and comparing the result against a predetermined threshold number. In other variants, flatness is determined by calculating variance or standard deviation using the power measurements, and comparing results against a predetermined threshold variance or standard deviation. In one implementation, the predetermined threshold number(s) are the same for every frequency channel. In another implementation, the predetermined threshold number(s) are different for different frequency channels.

In another embodiment, a signal of a frequency channel is deemed as acceptable if (i) its power is above the threshold power and (ii) it has an appropriately "flat" profile. In another embodiment, a signal on a frequency channel is determined to be acceptable if it either has power above threshold power or a sufficiently flat profile.

In yet another embodiment, the determination of whether the cable outlet can support provision of services includes (i) determining whether the number of acceptable frequency channels is greater than or equal to a predetermined number X, and (ii) finding Y or more consecutive signals of the tested frequencies are acceptable. In one implementation, X is fifty (50) and Y is four (4).

In one alternative embodiment, the evaluation of the plurality of RF frequencies includes: measuring signal power on the entire available RF spectrum (instead of scanning only a set of frequencies); and comparing the obtained power measurements to a threshold power. Measuring signal power on the entire available RF spectrum can include measuring RF power of signals of a plurality of frequency bands along the entire available spectrum, wherein the plurality of frequency bands are related to one another by some predetermined interval. In one variant, an average of the signal power measured along the entire spectrum is compared to the threshold power and the determination of whether the cable outlet can support provision of services is based on the comparison.

In another alternative embodiment, the evaluation of the plurality of RF frequencies includes: measuring signal power on the entire available RF spectrum; and comparing individual power measurements against a plurality of pre-determined power threshold numbers. The power threshold numbers can be the same for every comparison or can vary with the frequency. In one variant, only a portion of the measured signals is compared against power threshold numbers. The portion of the measured signals can correspond to channel frequencies relevant to a cable network operator.

In yet a further aspect, a method of reducing or eliminating unnecessary CPE installation attempts is disclosed. In one embodiment, the method includes obtaining an indication, prior to attempting installation, of whether one or more cable outlets at one or more potential customer premises can support digital content services provided by a content network operator via use of a go/no-go testing device provided to the potential customer by the network operator.

In one variant, the method includes distributing the plurality of electronic devices to a plurality of customer premises, wherein each of the electronic devices is further configured to determine whether a cable outlet can support the digital media services based at least on the geographical region in which its respective customer premises is located. In one variant, the plurality of electronic devices includes at least a first and a second set of electronic devices, the first set configured for a first geographical region and the second set configured to a second geographical region In another aspect, a method of testing for FWA installation suitability is disclosed. In one embodiment, the method includes testing an extant cable connection for continuity to a rooftop or external OTA or other antenna which can be re-purposed for use by the FWA installation.

In one embodiment, the method includes selecting a list of target frequencies, measuring and evaluating RF signals on each of the target frequencies, and based on the evaluations, determining and indicating whether the cable outlet passes or fails the cable connection test. The selecting the list of target frequencies includes obtaining a conditions/limiting information for the list of target frequencies, such as at least one of: (i) geographic region, (ii) type or subscription level, (iii) number of desired frequencies, (iv) minimum frequency intervals between tested frequencies, or (v) minimum or maximum allowed frequencies. In one variant, the conditions include only a geographic region and selecting the list of target frequencies includes: obtaining a list of frequencies used by the cable network operator in the geographic region; obtaining a list of frequencies used by satellite or OTA TV in the geographic region; and removing conflicting frequencies (present on both lists) from the list of frequencies used by the cable network operator.

In another aspect, a method of generating a list of frequency channels for use in a cable viability test is disclosed. In one embodiment, the method includes obtaining frequency list conditions including one or more of: (i) location information, (ii) frequency channel information specific to a cable network service provider, (iii) number of frequencies, or (iv) types of frequencies. In one variant, the location information includes cable market or service area information, including data indicating frequency channels used by cable service providers inside a cable market or service area. In one variant, the frequency channel information specific to the cable service provider includes data indicating frequency channels used by the service provider for different levels or types of subscription/services offered by the service provider.

In a further aspect, an integrated circuit (IC) device configured to measure and evaluate at least portions of an RF spectrum is disclosed. In one embodiment, the integrated circuit is further configured to drive a visual display element to deliver results of the evaluation. In one variant, the visual display element includes at least one light emitting diode (LED). In one implementation, the visual display element is single dual color LED. In one variant, the visual display element includes a plurality of LEDs. In one embodiment, the integrated circuit is configured to drive audio output to deliver results of the evaluation. In one embodiment, the integrated circuit includes at least one frequency filter and at least one radio frequency (RF) signal detector. In one variant, the frequency filter is a band pass filter. In one embodiment, the integrated circuit further includes a power source, and the integrated circuit is further configured to drive a visual display or an audio output element to indicate a status of the power source.

In one embodiment, the IC device is embodied as a SoC (system on Chip) device. In another embodiment, an ASIC (application specific IC) is used as the basis of the device. In yet another embodiment, a chip set (i.e., multiple ICs used in coordinated fashion) is disclosed. In yet another embodiment, the device comprises a multi-logic block FPGA device. In one embodiment, the integrated circuit is configured to execute a plurality of functions. In one variant, at least some of the functions are performed via hardware. In one variant, at least some of the functions are received in software.

In another aspect, an integrated circuit (IC) device implementing one or more of the foregoing aspects of RF signal evaluation, frequency list generation and/or cable testing is disclosed and described. In one embodiment, the IC device is embodied as a SoC (system on Chip) device. In another embodiment, an ASIC (application specific IC) is used as the basis of the device. In yet another embodiment, a chip set (i.e., multiple ICs used in coordinated fashion) is disclosed. In yet another embodiment, the device comprises a multi-logic block FPGA device.

In another aspect, a computer readable storage apparatus implementing one or more of the foregoing aspects is disclosed and described. In one embodiment, the computer readable apparatus comprises a program memory, or an EEPROM.

In another aspect, a network server process and architecture configured to interface with customer premises testing equipment is disclosed. In one embodiment, the server process and architecture utilize a user's personal electronics or client device (e.g., tablet or smartphone or PC) to establish communication between the testing device at the premises and the network server process. In another approach, other extant MSO equipment (e.g., FWA installation or telephony system) is used. One- or two-way data can occur between the test device/premises and the MSO process in order to facilitate e.g., subsequent installation or troubleshooting.

These and other aspects shall become apparent when considered in light of the disclosure provided herein.

BRIEF DESCRIPTION OF THE DRAWINGS

FIG. 3 is a flow chart of an exemplary method of measuring and evaluating a signal at a specific frequency which may be used with various aspects of the present disclosure.

FIG. 4 is a flow chart of another exemplary embodiment of a cable testing method in accordance with aspects of the present disclosure.

FIG. 6 is a flow chart of another exemplary embodiment of a cable testing method in accordance with aspects of the present disclosure.

FIG. 7 is a flow chart of a cable testing method using a full spectrum power measurement, in accordance with the present disclosure.

FIGS. 10A-10E are illustrations of one exemplary embodiment of a cable testing device in accordance with the present disclosure.

Figure 1A:
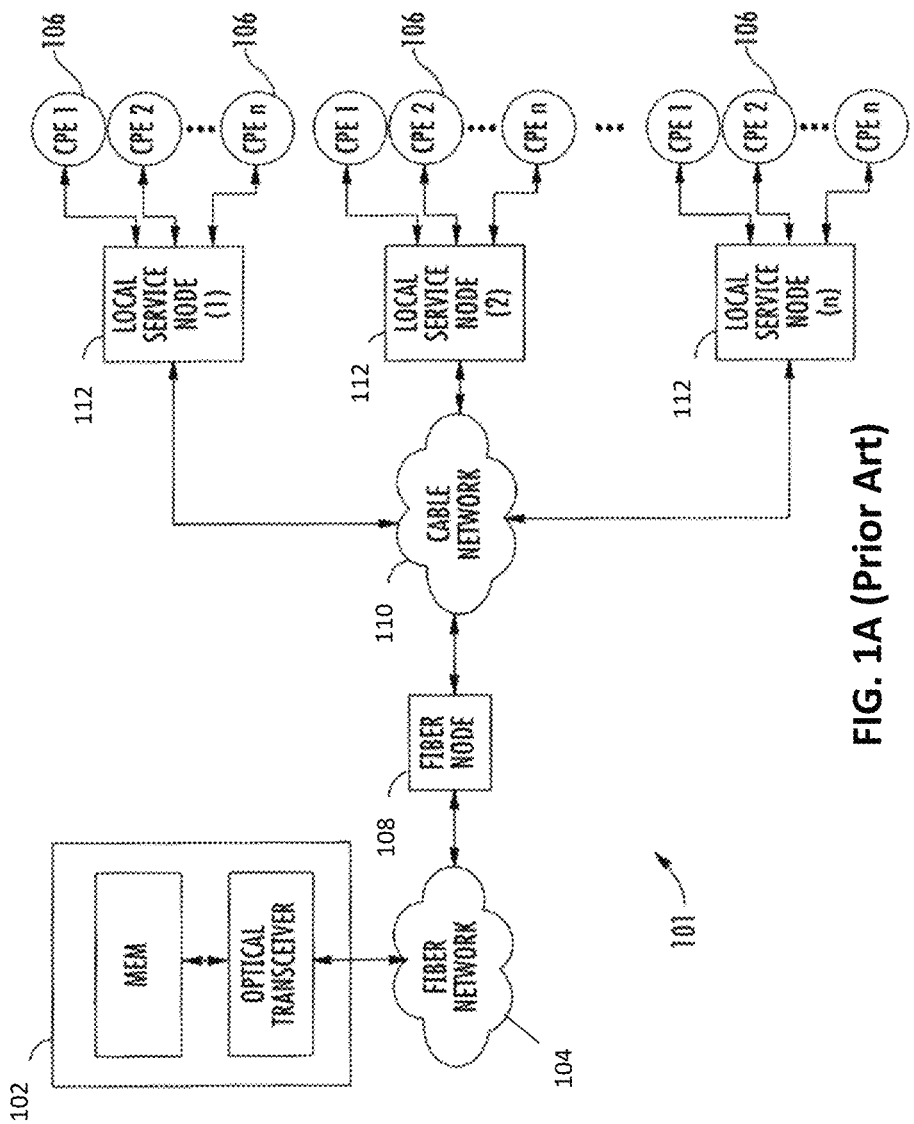
FIG. 1A is a functional block diagram illustrating one exemplary local service node configuration useful with various aspects of the present disclosure.
Figure 1B:
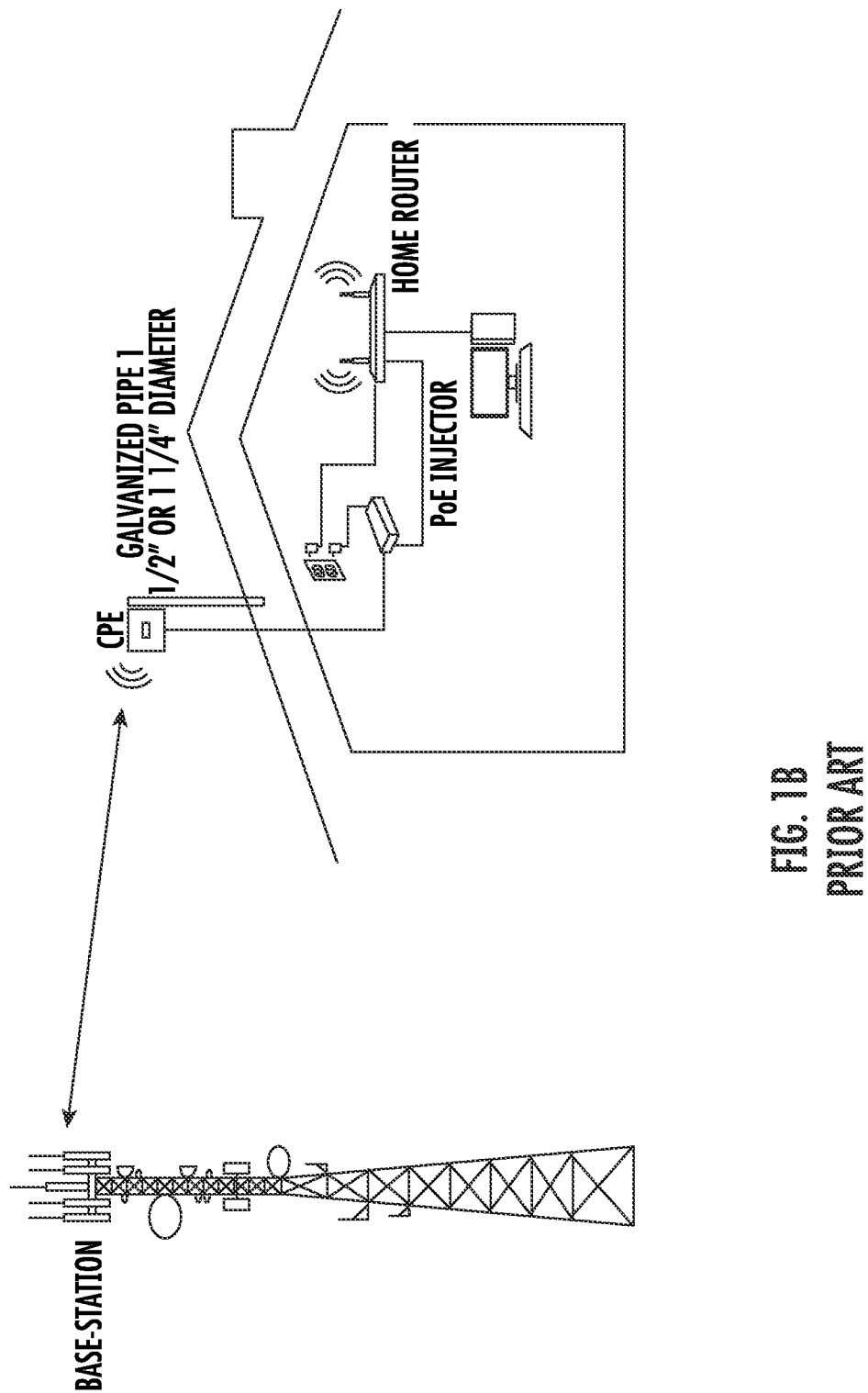
FIG. 1B is a graphical illustration representing a typical prior art Fixed Wireless Access (FWA) installation.

All figures © Copyright 2019-2020 Charter Communications Operating, LLC. All rights reserved.

DETAILED DESCRIPTION

Reference is now made to the drawings wherein like numerals refer to like parts throughout.

As used herein, the term "application" refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the term "client device" includes, but is not limited to, CPE, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", and smartphones, IoT devices, and vehicle infotainment systems.

As used herein, the term "computer program" or "software" is meant to include any sequence or human or machine cognizable steps which perform a function. Such program may be rendered in virtually any programming language or environment including, for example, C/C++, Fortran, COBOL, PASCAL, Ruby, Python, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

The term "Customer Premises Equipment (CPE)" refers without limitation to any type of electronic equipment located within a customer's or subscriber's premises and connected to or in communication with a network.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM. PROM, EEPROM, DRAM, SDRAM, DDR/2 SDRAM, GDDRx, EDO/FPMS, RLDRAM, SRAM, "flash" memory (e.g., NAND/NOR), 3D memory, and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, GPUs, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the term "DOCSIS" refers to any of the existing or planned variants of the Data Over Cable Services Interface Specification, including for example DOCSIS versions 1.0, 1.1, 2.0, 3.0, 3.1, and 4.0 (previously, Full Duplex 3.1).

As used herein, the term "headend" or "backend" refers generally to a networked system controlled by an operator (e.g., an MSO) that distributes programming to MSO clientele using client devices, or provides other services such as high-speed data delivery and backhaul.

As used herein, the term "network interface" refers to any signal or data interface with a component or network including, without limitation, those of the FireWire (e.g., FW400, FW800, etc.), Thunderbolt, USB (e.g., USB 2.0, USB 3.0, etc.), DisplayPort, NVLink, Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), Zigbee®, Z-wave, PAN (e.g., 802.15 or BLE), power line carrier (PLC), or IrDA families.

As used herein, the term "QAM" refers to modulation schemes used for sending signals over cable networks. Such modulation scheme might use any constellation level (e.g. QPSK, 16-QAM, 64-QAM, 256-QAM, etc.) depending on details of a cable network. A QAM may also refer to a physical channel modulated according to the schemes.

As used herein, the term "storage" refers to without limitation computer hard drives, SSDs, DVR devices, flash drives, memory, RAID devices or arrays, optical media (e.g., CD-ROMs, Laserdiscs, Blu-Ray, etc.), or any other devices or media capable of storing content or other information.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A, 5G NR, analog cellular, CDPD, satellite systems, millimeter wave or microwave systems, acoustic, and infrared (i.e., IrDA).

Overview

The present disclosure provides, inter alia, improved methods and apparatus for performing a test of a connection such as via an outlet or terminal in order to determine whether the connection can support delivery of certain content and services from a service provider.

In an exemplary embodiment of the disclosure, an electronic device configured to evaluate a cable outlet (e.g., one used for delivery of cable television or broadband services over a coaxial cable) is provided. The electronic device is configured to detect and evaluate RF signals from the cable outlet to which the device is connected to provide a "pass/fail" indication, such as via a single dual color LED or audio tone(s). In one implementation, the electronic device passively measures RF signals which may be present on the cable outlet, and lacks the ability to send any RF signals (e.g., upstream on the cable). The electronic device is configured to perform the detection and evaluation of RF signals internally on the device via one or more evaluation algorithms which can assess whether viable cable television signals are present, and optionally whether other signals such as OTA broadcast television signals or satellite signals are present.

In one exemplary approach, signals are measured at a number of target frequencies only, and the power and characteristics of the measured signals evaluated by the aforementioned device in order to make the determination of cable outlet or service provision viability. The target frequencies may be selected so as to include frequencies (including prescribed groups of frequencies with specific characteristics) used by cable service providers generally (or the specific service provider individually), and exclude frequencies used by satellite systems or OTA broadcasters. These lists may be further refined based on geography or markets within which the premises being tested is located.

The cable testing device advantageously can be constructed using comparatively low-cost components and distributed by a service provider to potential customer premises prior to attempting installation/setup of cable services, thereby potentially obviating unnecessary installation calls or "truck rolls" to the premises. For example, a cable testing device may be distributed to potential customer premises (via direct mail to the customer, or with an installer/technician) in order to determine: (i) whether cable service is possible at the premises given its current configuration, (ii) what levels or types of service are possible, and (iii) whether particular cable outlets within the premises are acceptable/preferable for delivery of the cable services.

In other variants, possible installation or troubleshooting of service provider-based wireless systems (e.g., CBRS Fixed Wireless Access devices or the like) at customer premises can be evaluated, such as to determine whether coaxial cabling or other infrastructure within the premises is suitable to support a rooftop or other wireless premises device (e.g., via detection of OTA broadcast signals indicating signal continuity between the tested outlet and an extant rooftop OTA antenna or FWA device).

DETAILED DESCRIPTION OF EXEMPLARY EMBODIMENTS

Exemplary embodiments of the apparatus and methods of the present disclosure are now described in detail. While these exemplary embodiments are described in the context of obtaining the readiness or suitability status of coaxial cable connections with respect to cable network services or providers, the methods of the present disclosure may be applied to other types of connections and other types of content/service providers.

It will also be appreciated that while described generally in the context of a network providing service to a customer or consumer or end user or subscriber (i.e., within a prescribed service area, venue, or other type of premises), the present disclosure may be readily adapted to other types of environments including, e.g., outdoors, commercial/retail, or enterprise domain (e.g., businesses), or even governmental uses. Yet other applications are possible.

It will also be appreciated that while described primarily in the context of initial installation of service provider equipment or establishment of services, the exemplary embodiments of the methods and apparatus set forth herein may be readily adapted by those of ordinary skill to other types of use cases or scenarios, including for example post-installation or service-establishment troubleshooting and/or remediation.

Other features and advantages of the present disclosure will immediately be recognized by persons of ordinary skill in the art with reference to the attached drawings and detailed description of exemplary embodiments as given below.

Method—

Figure 2:
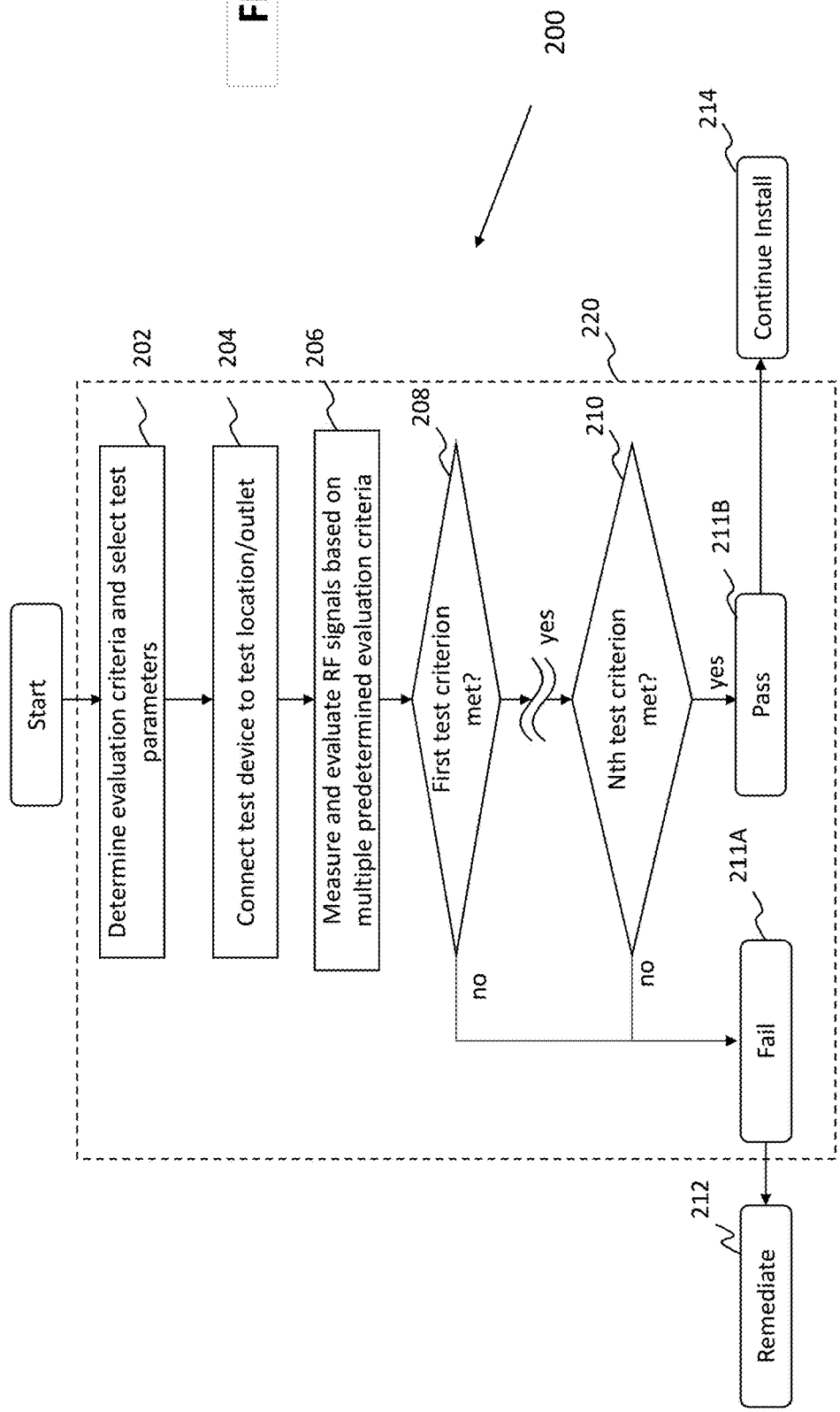
FIG. 2 is a logical flow chart illustrating a generalized testing method according to one exemplary embodiment of the present disclosure.

FIG. 2 illustrates one embodiment of a generalized method for cable testing according to the disclosure. As shown in FIG. 2, the method 200 includes first determining one or more evaluation criteria and selecting one or more test parameters. For instance, depending on the application (e.g., coaxial cable from a cable plant, or associated with an FWA installation) and the premises (e.g., location, type of services available, etc.), different criteria may be employed as part of the test regime. In one variant, the test criteria and parameters are pre-loaded into a test device 900 (see e.g., the embodiments of FIGS. 9-17 herein) such as in a memory or storage device thereof, so that the end user is not required to select or enter any such data for ease of operation and consistency. In another variant, multiple sets of criteria/parameters are loaded into the device memory such the device can be used in multiple different types of settings or applications, as described in greater detail subsequently herein.

At step 204, the test device is electrically connected to the test location or outlet (e.g., via a an F-Type or other such standardized connector).

At step 206, any RF signals present on the connector are evaluated in light of the evaluation criteria of step 202. In the illustrated embodiment, multiple criteria are utilized (i.e., criteria 1 through N, where N>1), and are applied in sequence, although this sequencing is not a requirement (e.g., it is contemplated that two or more test of the N total tests may be performed in parallel). Moreover, the present disclosure contemplates test hierarchies depending on the criteria selected (e.g., for one test regime having N criteria, the order of testing may be different than that of another regime for another application and having M criteria, and so forth).

Per steps 208 and 210, the various criteria are evaluated, and any one failing its respective test produces a failure condition (step 211A) and subsequent remediation per step 212. Alternatively, if all N criteria are met, then a pass condition (211B) is produced, and the equipment/service installation process may be continued per step 214.

Figure 2A:
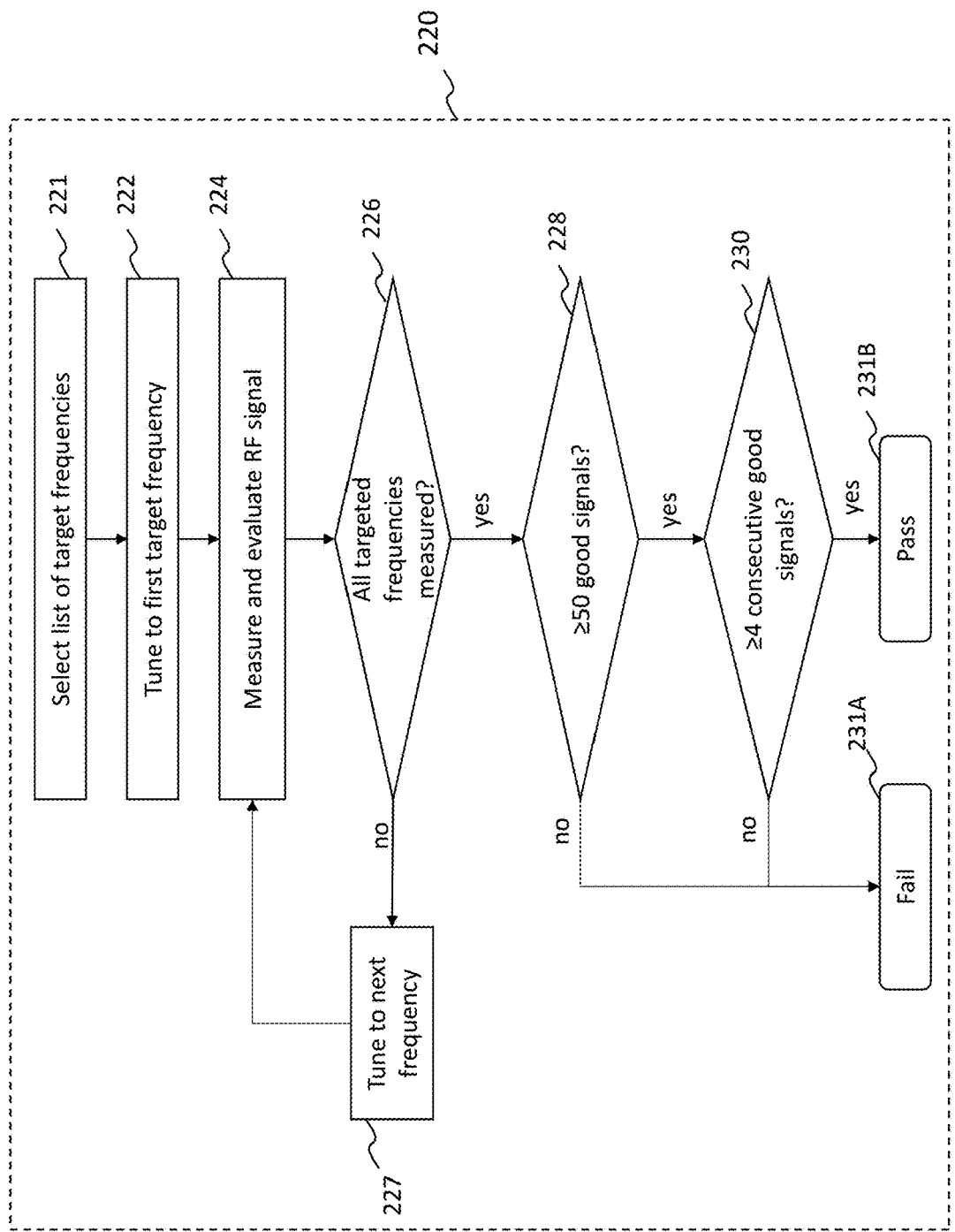
FIG. 2A is a logical flow chart illustrating one implementation of the generalized method of FIG. 2, in the context of an HFC cable distribution network and premises outlet.

FIG. 2A illustrates one exemplary implementation of the method of FIG. 2, specifically in the context of coaxial cable testing.

As shown, the method 220 of FIG. 2A is performed using a plurality of targeted frequencies.

At step 221 of the method 220, a list of target frequencies is selected. In one embodiment, the list of target/desired frequencies may be stored in the device 900 as previously described. In another embodiment, the list of target frequencies is provided to the device 900 from an external source (e.g., a cable network server through the Internet, an application/program associated with the device 900, a BLE (Bluetooth Low Energy) or other wireless interface to another device, etc.).

In one embodiment, a single list of frequencies is preselected and preprogrammed for the device 900 by the device manufacturer/provider (based on e.g., the user's location and market and services available thereto), so that no selection is necessary during the cable test.

In another embodiment, the cable testing device 900 selects a list of targeted frequencies from several available/ stored lists of frequencies during the cable test 220. In one variant, the selection is made on the basis of user input. For example, a user of the device 900 can select their current geographical location or a desired level of cable subscription. In another variant, the selection is performed autonomously by the device 900 during the cable test 220. For example, the device 900 can determine a geographical region in which the tested cable outlet is located (e.g., via a wireless connection to another device or an initial analysis of the signals available on the cable, or via indigenous GPS receiver or other such location device, or even via association with a WLAN or other access point of known IP address and hence location).

In step 222, the test device 900 tunes into a first target frequency on the target list. The device 900 can tune into the targeted frequency by, for instance, using a band pass filter to reject/attenuate all frequencies above and below a prescribed frequency range (e.g., 57 MHz to 1000 MHz, corresponding to bands having traditional cable 6 MHz wide QAMs utilized in North America, or 8 MHz QAMs used in Europe) centered on the target frequency, the latter selected based on a known or pre-existing frequency plan utilized by the cable operator. If the nominal center frequencies of each channel are not known a priori, the present disclosure contemplates use of an energy detection/correlation approach (e.g., akin to that used in CDMA systems) to identify the presence of signals within a prescribed frequency band. In another more sophisticated embodiment, some signal processing may be applied to the RF signals before, after, or instead of applying the band pass filter (e.g. filtering of signals using an FFT, akin to an OFDM receiver). As such, it will be recognized that varying levels of complexity may be used within the testing device's RF receiver, including even heterodyne approaches (e.g., down-conversion to baseband, and subsequent processing of baseband signals by e.g., a DSP or baseband chipset).

Note also that the method 220 may use a smaller bandwidth centered around a target frequency in order to avoid detecting any noise and/or sideband transmission regions (e.g., at edges of the designated band).

In one embodiment, the frequency range may be a preselected for the cable testing device (e.g., during manufacture/programming of the algorithm). In one variant thereof, the preselected range is constant for every target frequency of the list to be evaluated. In another variant, different ranges are preselected for and applied to different target frequencies, such as for cases where different channel widths may be present.

In step 224, the device 900 measures and evaluates the RF signal power (i.e. the peak and/or integrated amplitude of the signal) at the targeted frequency. Details of exemplary implementations of measurement and evaluation steps are discussed further in the disclosure (FIG. 3). The evaluation portion of step 224 is used to determine whether the targeted frequency has a sufficient signal quality for provision of content/services over the cable connection by a cable network provider. An indication of the results of the frequency evaluation for each target frequency can be temporarily stored within the device, such as within a memory thereof. In one embodiment, only indications of acceptable/sufficient signals are stored. In addition, an indication that a particular frequency has been measured and evaluated can also be recorded (e.g., the data may be logged in association with a channel number or frequency so as to facilitate subsequent analysis, including by cable headend or other personnel or processes such as application computer programs accessible to the user via Internet).

In step 226, the device 900 determines whether all the target frequencies on the list or profile have been measured and evaluated. If some of the target frequencies have not yet been measured, the device is tuned to the next target frequency (step 227).

In one embodiment, steps 222-227 are performed in series by a single RF detector/front end within the cable testing device 900 and are applied to all frequencies in the list of target frequencies.

In another embodiment, the list of target frequencies may be separated into two or more smaller lists which are separately processed by two or more RF detectors. For example, a low-frequency list may be processed by a first RF detector circuit adapted for a certain range of frequencies, and a high-frequency list may be processed by a second RF detector adapted for higher frequencies. In one variant, the first and second RF detectors are optimized to measure/ evaluate specific ranges of frequencies (e.g., first RF detector can better process low frequency signals and the second RF detector can better process high frequency signals).

Once all of the target frequencies have been measured and evaluated, the method 220 proceeds to step 228.

In step 228, the number of acceptable or passing frequency channels is compared against one or more predetermined threshold values.

In one exemplary embodiment, the threshold number of acceptable signals is selected to be higher than a number of frequency channels that may be used by over the air (OTA) antennas (i.e., so as to eliminate the possibility that the received RF signals are from an OTA broadcaster), yet lower than a number of channels used by a cable network service provider (e.g., the MSO issuing the device 900 to the customer). For example, cable network service providers typically employ at least fifty (50) individual or discrete frequency channels, while OTA TV antennas typically don't exceed thirty (30) channels. Therefore, the threshold number of acceptable signals may be set to fifty for this example.

In other embodiments, the threshold number of acceptable frequency channels can be set higher or lower than fifty. If needed, the threshold number may be set higher or lower in order to change the "sensitivity" of the cable testing device 900. For example, setting the threshold number to seventy (70) can increase the certainty that a test "pass" result generated by the cable testing device 900 is correct, but might also result in the cable testing device mistakenly failing some otherwise useable cable connections. Conversely, setting the threshold number to thirty-five (35) in the foregoing example scenario might lead to the device 900 providing passing results to some number of unacceptable cable connections. In prototype testing of the device 900 by the Assignee hereof, setting the threshold number to fifty (50) has been determined to provide accurate but not unduly stringent cable connection suitability results.

In some embodiments, the threshold number of acceptable signals can vary between different applications, such as for different cable markets (i.e., geographical regions) in order to account for (i) different numbers of frequency channels used by OTA TV broadcasters, and/or (ii) different cable network providers or RF channel configurations within the different regions. In some embodiments, the threshold number of acceptable discrete signals depends on the list of frequencies itself (e.g., if the number of tested frequencies is lower, the threshold number is scaled to a correspondingly lower value).

It will further be appreciated that different hierarchies or testing regimes can be applied to different portions of the RF spectrum carried over the measured medium (e.g., coaxial cable). For instance, it is contemplated that in the future, higher frequencies will be utilized on the cable medium (e.g., up to 1.6 GHz and beyond), since extant cable installations are physically capable of such performance (with certain modifications such as change of amplifier sand tap configurations). Moreover, some frequency bands such as for DOCSIS 4.0 may be reprogrammable and vary from a traditional "static" model. As such, these "next generation" services delivered at higher frequencies may utilize different modulation and coding schemes (e.g., ODFM, 256-QAM versus 64-QAM, etc.), and may vary as a function of time, application, service provider, and market as well as other factors. Hence, a test regime which may be effective at e.g., traditional frequencies and MCS values may not be so for next generation services, and as such two (or more) different regimes are contemplated for use by the device 900 in such cases. For example, average or peak power within a 64-QAM 6 MHz channel may be different than that of a 256-QAM signal of a different frequency bandwidth, and as such errant results may be obtained from one or the other if a "one-size fits all" approach is utilized.

If in step 228, it is determined that there are fewer good signals than the threshold number (e.g., fewer than 50 good signals), the connection is determined to have failed the test (step 231A). The cable testing device then indicates the failed test to the user of the device via a user interface. User display elements are described later in the disclosure (e.g., with respect to FIGS. 9A-9C).

If in step 228, it is determined that the number of good signals is greater than or equal to the threshold number, the algorithm moves to step 230.

It will be appreciated that in some embodiments, repeat testing of the same frequency or band per steps 224-228 can be performed, whether in sequence or as part of a repetition of a larger testing pattern, such as to verify accuracy or repeatability of test results, or for averaging/peak detection purposes. For instance, in one variant, multiple measurements may be obtained for the same test frequency in sequence (e.g., separated by a prescribed testing interval), after which the algorithm moves on to the next frequency in the test pattern. Alternatively, the algorithm may cycle through the entire test regime (or portions thereof), and then repeat one or more times to gather additional data. As another alternative, the algorithm may be configured to evaluate one or more data values obtained (e.g., where an ambiguous or highly variable set of data is obtained for a given frequency), and make a data-dependent decision on whether to gather additional data points or not. Myriad other such variations will be appreciated by those of ordinary skill given the present disclosure.

Accordingly, in one embodiment, at step 230 of method, the cable testing device 900 determines whether a threshold number of consecutive good signals has been found. In other words, the method seeks to determine whether out of all the tested/targeted frequencies, four consecutive frequencies have been deemed acceptable. The assignee hereof has determined in prototype testing that in some scenarios, setting the threshold number of consecutive good signals to four (4) leads to accurate results. Specifically, in the exemplary embodiment, this test is used to distinguish over-the-air (broadcast) TV signals from cable signals, since the TV signal levels are usually highly variable, and only rarely are there more than a given number (e.g., 4) consecutive active signals in such signals. Hence, the test is configured for N (e.g. 4) adjacent active/good signals with RF levels falling within 5 dB of each other. Notwithstanding, it will be appreciated by those of ordinary skill that a different threshold number of consecutive good signals may be set for e.g., different geographical markets, frequency use plans, or to adjust the "sensitivity" of the cable testing device.

The threshold number of consecutive good signals may be constant, or alternatively may be varied, such as depending on the total number of target frequencies, the geographical location of the test, frequency plan used for providing the proposed services, or other parameters. In one embodiment, the threshold number of consecutive good signals depends on the total number of good signals. For example, the test of step 3300 may be more exacting (i.e., require more consecutive good signals) if the total number of good signals found on the connection in totality is lower. In one implementation, the threshold number of consecutive good signals is inversely related (e.g., proportional) to the number of good signals measured by the device 900.

In another implementation, the threshold number is related to the total number of consecutive sequences identified (e.g., if more than N individual consecutive sequences of 4 are identified, then the test is deemed to pass).

If threshold number (e.g., four) of consecutive good frequencies has not been found, the cable connection or outlet is determined to have failed the test (step 231A). If threshold number of consecutive good frequencies has been found, the cable connection or outlet is determined to have passed the test (step 231B), and the cable testing device 900 indicates the pass to a user of the device via a user interface/display element.

In one variant, the device 900 can select (i) any or none of the list of frequencies, (ii) the threshold of good signals (total), and/or (iii) the threshold of consecutive good signals, based various parameters (e.g., geographical market, cable subscription level, desired services, etc.). For instance, a prospective "basic cable" service plan might warrant testing of only a limited number of frequencies within a prescribed portion of the service frequency plan for a given service provider within a given geographic region or market, whereas a premium subscription service might necessitate a broader degree of testing, as well as additional signal quality (described in greater detail subsequently herein).

FIG. 3 illustrates an exemplary method 224 of measuring and evaluating the signal on a particular frequency f. This method can be used for example to perform step 224 in the cable testing method of FIG. 2A.

In step 302 of the method, the RF signal within the designated frequency range is measured by the cable testing device 900. To obtain both a more accurate power measurement of the RF signal at the target frequency and a profile of the signal, the RF signal may be measured several times in a row, such as within successive temporal periods. In one embodiment, a plurality of measurements can be taken within a preselected time frame at preselected time intervals. The time frame and/or the time intervals may depend for example on the particular target frequency. In another variant, the time frame and/or the time intervals are constant for all frequencies.

In step 304, the power of the signal is determined based on the measurements of step 302 and evaluated. In one embodiment, the power is determined by taking the mean or average of all the power measurements obtained in step 302. In another embodiment, the power of the signal is determined by averaging only a portion of the available measurements (e.g., using only the upper half of the measurements, only using the top N measurements, discarding measurements that appear to be outliers, etc.). In another embodiment, the power can be determined by taking a weighted average of the power measurements. For example, lower power measurements might not be disregarded, but higher power measurements may be given more weight than lower power measurements. In yet another embodiment, the power of the signal is obtained by simply taking the top or peak power measurement obtained in step 112.

Yet other measures or tests may be used in place of or in conjunction with the foregoing, including for example determination that a given signal (or group of signals) falls within a prescribed range (e.g., the signal power must be within a range of ±14 dBmV) for the signal to be considered acceptable.

After the power of the RF signal is calculated, it is compared against a predetermined threshold acceptable power level.

If the calculated power is below the threshold power value, for the purposes of the current evaluation, the RF signal at frequency f is considered an unacceptable signal (step 308A). If the calculated power is equal to or greater than the threshold power, the method moves on to step 306.

In step 306, the shape/profile of the signal is determined and evaluated. Since digital cable channels typically use quadrature amplitude modulation (QAM), the method of FIG. 2A in one variant seeks to determine whether the given measured signal has a profile similar to a QAM signal (for instance, a "flat" profile within a prescribed portion of the measured frequency band). In one variant, successive measurements are utilized to determine flatness or consistency in the temporal domain (e.g., are the measured RF signal levels similar, thereby indicating QAM-modulated signals, or have a wide variance, thereby potentially indicating OTA TV or other similar signals). This testing can help differentiate the digital cable network signals from over the air (OTA) antenna signals, the RF signal profile of which may tend to have a greater degree of variability more peaks and valleys.

In one embodiment, the method includes determining whether the signal has a sufficiently flat profile by calculating variance or standard deviation of the power (amplitude) measurements obtained in step 302 as a function of time or another parameter (e.g., frequency), and comparing the result to a predetermined threshold variance or threshold standard deviation, respectively. For example, in one implementation, consecutive QAM signal levels should be largely consistent, and hence 4 consecutive good signals that are all within 5 dB of one another are used as a basis for a "pass/fail" determination. Alternatively, characteristics such as frequency versus amplitude may be used to further identify qualifying signals.

The predetermined threshold(s) can be constant, or can vary with different frequencies or over time. In another embodiment, the flatness is determined by simply subtracting the highest measured power from the lowest measured power, and comparing the result against a predetermined threshold number. Other ways of determining whether a desired signal profile exists, as well as other ways of determining whether signal characteristics resemble QAM signals or other types of modulation (such as QPSK) may be used consistent with the current disclosure.

If it is determined that the measured RF signal is not sufficiently flat (or otherwise does not have the desired profile or characteristics), the RF signal is determined to be unacceptable (step 308A). If the RF signal characteristics are sufficiently flat/acceptable, the signal is counted per step 308B. The results of the method 224 (i.e. good/bad signal at frequency f) may be stored within the device 900 for later use, or transmitted off-board as described in greater detail subsequently herein. It should be noted that steps 304 and 306 can be performed in reverse order, or in parallel if desired, or even integrated into a common step.

FIG. 4 illustrates another exemplary method 400 for determining the status of a cable outlet connection, and providing a cable pass or cable fail result. The method 400 is similar to the method 220 described with respect to FIG. 2A; however, the consecutive verification step 230 is skipped such that the cable testing device deems the cable as passing the test if a threshold number of good frequency channels is found (step 408), regardless of where the frequency channels are found. If enough (e.g., more than or equal to fifty) good signals are detected, the cable test is passed (step 410B). If not, the cable test is failed (step 410A).

Figure 5:
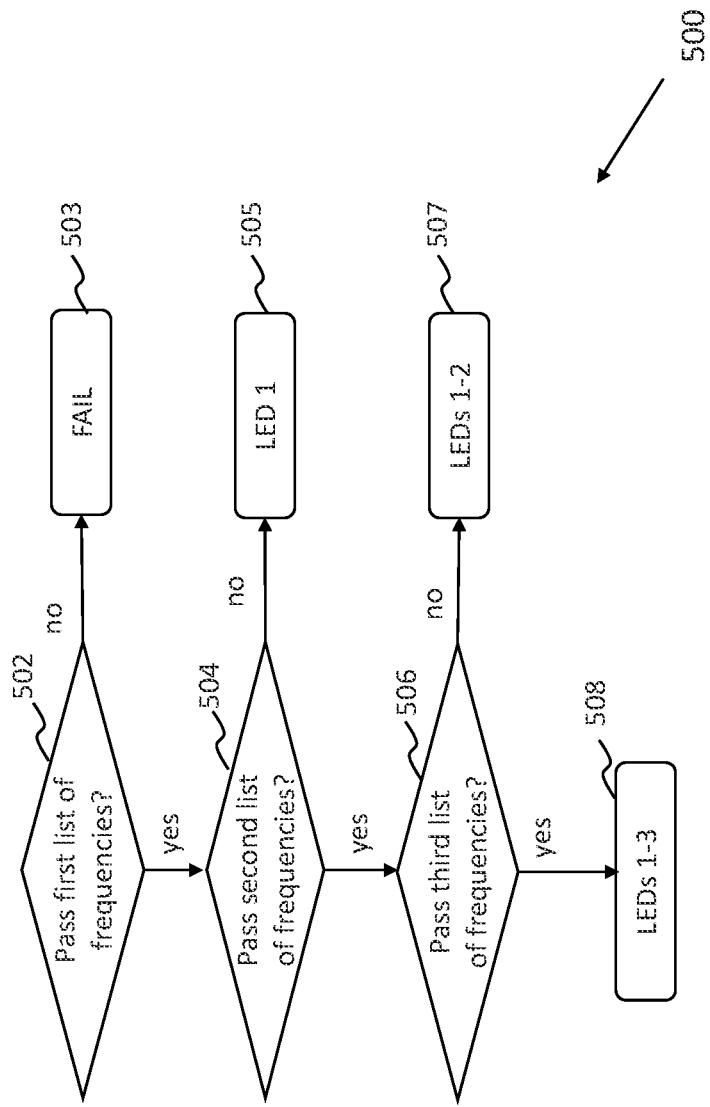
FIG. 5 is a flow chart of another exemplary embodiment of a cable testing method in accordance with aspects of the present disclosure.

FIGS. 5-6 illustrate exemplary methods 500 and 600 of determining the status of a cable connection and providing cable pass or fail results, specifically for different potential types of services. For example, a first type of cable subscription service may produce a first number of specific channel frequencies get viable signals, the next service may produce a smaller number of specific channel frequencies, and yet another service may produce an even small number of channel frequencies. This may in some cases correspond generally to the number of channels afforded to a subscriber via each service. As a brief aside, a network process such as a CMTS typically determines which QAM channels are active for a given service, and hence the number of QAM channels present on the connection may in some cases be correlated to a particular service. Moreover, the methods of FIGS. 5-6 may be used to provide information about how many channels are active in a particular neighborhood, city, market, etc.

Further, the cable testing device 900 can be used to test a cable outlet against (i) different lists of frequencies that are wholly independent from one another (i.e., have no overlap or common frequencies), and/or (ii) that are associated with something other than cable subscription levels. For instance, in one embodiment, the different frequency lists may correspond to different types of services or functions such as DOCSIS, cable video (aka "in band" services), OOB (out of band) or sideband communications, VoIP (to the degree that they are allocated onto something other than e.g., DOCSIS bands), or even bands associated with FWA or similar devices (e.g., that are at wireless transmission frequencies, or have been down-converted to baseband before being transmitted over a coaxial cable within the premises.

As such, different lists of relevant RF channels or frequencies can be developed for each different type of service (or even in some cases subscription level, where such level can be correlated to a different channel or QAM profile), such that a representative fraction or sampling of the channels of each type or level can be conducted. A given premises or cable outlet may provide a connection that fails the test for a first type of service (e.g., a highest possible cable subscription, or a service having a given frequency or channel profile), but would still be able to support a different or other level of service (e.g., less program and RF channels), especially where the disabilities affecting the first service or higher subscription level are associated with a common portion of the total spectrum (e.g., where the lower end of the spectrum delivered by the cable is fine, and the "basic" cable program channels are all mapped to QAMs within that lower end). In one embodiment, the results of the methods 170/180 of FIGS. 5-6 may be provided to a user of the device 900 via a user interface shown in FIG. 9C.

FIG. 5 illustrates a method 500 of determining the status of a cable connection for various types of services or levels of cable subscriptions in which a first list of frequencies corresponds to the minimum number of strong signal channel frequencies that a cable should exhibit in order to receive e.g., a first type of service or cable channel subscription with the least number of channels. In one embodiment, the second list of frequencies corresponds to a larger number of channel frequencies (e.g., needed to provide a different service type and/or higher tier cable subscription) and includes the first list of frequencies. The third list of frequencies is larger than and includes the second list of frequencies. The frequencies in all three lists may be specific to a particular cable content provider (i.e., the cable content provider associated with the device 900). Alternatively, the different lists or profiles may be used to confirm the presence of a particular type of service (e.g., within a prescribed geographic region).

In step 502 of the method 500, a first list of frequencies is checked by the cable testing device 900. This step may be performed for example using the methods described with respect to FIG. 2 or 2A, or the method described with respect to FIG. 4. The predetermined threshold for "good" signals and sufficient consecutive good signals used in the methods of FIGS. 2 and 4 may depend on the particular list of frequencies; e.g. the thresholds may be lowered for smaller lists. The first list of frequencies may correspond to for instance a prescribed service type or first, smallest set of channels offered by a cable content provider (e.g., basic channels).

If the cable connection is not deemed viable for the first list of frequencies, the cable testing device 900 may indicate that the cable has failed the test for all three lists (step 503). This may be accomplished by turning three LEDs that correspond to three different types or levels red. If the cable is deemed viable for the first list of frequencies, the cable testing device may determine that the cable outlet/connection can at least support a first service type or level of subscription and move on to step 504.

In step 504, the cable connection is assessed using the second list of frequencies. If the cable is not deemed viable for the second list of frequencies, the cable testing device can indicate that the cable can only support the minimum channels at the first service type or lowest level of subscription (as previously determined in step 502). This may be accomplished by lighting a first LED indicating this type/level green (step 505), and either leaving the other LEDs off or turning them red. If instead the cable outlet passes the cable test using the second list of frequencies, the method 500 determines that it can at least support the first two types of service or levels of cable subscription, and moves on to step 506.

In one variant of step 504, the cable testing device performs a new test of the cable (using e.g., the method 220 of FIG. 2A) using the entire set of frequencies in the second list. In another variant, the method does not check any of the frequencies that have already been checked in step 502, but rather uses the results of step 502 to supplement the test of step 504. In other words, the cable testing device performs a new test of the cable using all the frequencies of the second list, except those that overlap with the first list.

In step 506, the cable signals are checked against the third list of frequencies. In one variant, the cable is checked only for frequencies in the third list that were not also found in either of the first two lists. If the cable does not pass inspection using the third list of frequencies, the cable testing device 900 can indicate that the cable connection can only support the first two service types/levels of subscription by e.g., lighting corresponding first two LEDs green (step 507). If the cable does pass inspection using this third (and largest) list of frequencies, the cable testing device determines and indicates that the cable has passed inspection for all three types/levels by, e.g. lighting all three corresponding LEDs green or lighting the third LED green (step 508).

FIG. 6 illustrates another embodiment of the method 600 of determining the status of a cable connection for various types of service or levels of subscriptions. The method 600 is similar to the method 500 of FIG. 5, except that the more complete list of frequencies is checked first, and the shortest/minimal list of frequencies is checked last.

In step 602 of the method 600, the first list of frequencies is used to assess the cable connection. In one embodiment, this is accomplished using the method 220 of FIG. 2A. If the cable passes inspection using the first (full) list of frequencies, the cable is determined to support all types of service or levels of subscription and the cable testing device gives an indication of this by, e.g. lighting green all three LEDs corresponding to the types/levels (step 603). If the cable does not pass the test in step 602, the method 600 proceeds to step 604.

In step 604, the second list of frequencies is used to assess the cable connection. If the cable passes inspection using the second list of frequencies, the cable is determined to (ostensibly) support the two lower types or levels of subscription.

The cable testing device can indicate this by lighting LEDs corresponding to the two lower types/levels green (step 605). If the cable does not pass inspection during step 604, the method proceeds to step 606.

In step 606, the cable connection is tested using the third set of frequencies similar to steps 602 and 604. If the cable passes the test in step 606b, it is determined that it can support only one type of service or lowest level of subscription. This is indicated to the user in step 607. If the cable fails the test in step 606, the cable testing device 900 can indicate that the cable cannot support any service/level of subscription, and provide on indication of this to the user by, e.g., lighting all indicator LEDs red (step 608).

It should be noted that although the methods 500 and 600 of FIGS. 5 and 6 respectively illustrate three types of service or levels of cable subscription, there may be a different number of types/levels (e.g., two, or more than three) to which the methods of FIGS. 5 and 6 would be equally applicable.

Figure 7A:
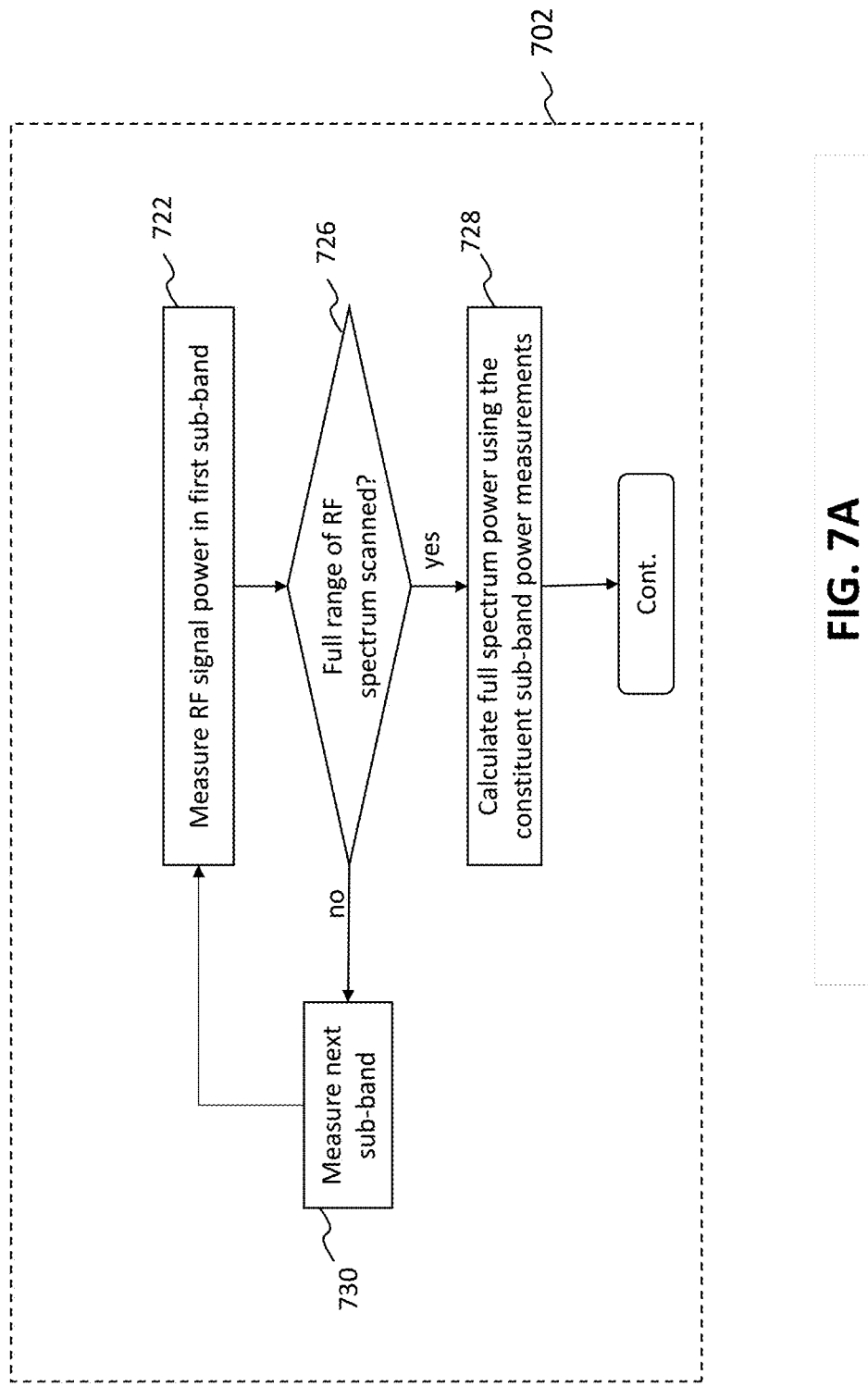
FIG. 7A is a flow chart of an exemplary method of determining the power level of a full RF spectrum which may be used with various aspects of the present disclosure.

FIG. 7 illustrates another exemplary method 700 for determining the status of a cable connection and providing a test "pass" or test "fail" result. Unlike the previously described methods, the method 700 of FIG. 7 does not scan specifically target frequency channels (i.e., corresponding to particular known QAM channels or the like), but rather evaluates swathes of spectrum to determine whether a sufficient level of RF energy is present therein. Per step 702, the cable testing device 900 measures the RF power level of the full spectrum (or designated portions thereof). This may be accomplished by taking a predetermined number of power measurements throughout the frequency spectrum, as will be described later with respect to FIG. 7A.

In step 704, the method 700 next determines whether the measured RF power level is greater than an acceptable power level (or otherwise meets one or more prescribed criteria). The acceptable power level may be for example a threshold power level that has been predetermined to indicate an acceptable cable connection based on known cable properties and performance characteristics.

If the power level of the measured spectrum is higher than or equal to the acceptable power threshold, the cable passes the test (step 706B). If the power level of the spectrum is lower than the acceptable threshold, the cable fails the test (step 706A). The cable testing device 900 can provide an indication of a pass or fail using e.g., a user interface as described with respect to FIG. 9A.

In one embodiment, the method 700 may be used in addition to one of the methods previously described in FIGS. 2-6 in order to verify or supplement the result(s) of the tests, or vice versa.

FIG. 7A illustrates one exemplary implementation of the method 702 for determining the RF power level of a full spectrum per FIG. 7. The method of FIG. 7A scans through all or portions of the total RF spectrum provided to an RF detector of the test device 900. In one embodiment, a predetermined number of power/amplitude measurements are made of the spectrum within different frequency bands or swathes (e.g., from 200 to 300 MHz, 400-600 MHz, etc.), such as via tuning of a wideband RF tuner/detector circuit to such band, or alternatively using a more narrowband detector circuit to iterate throughout the spectrum. This approach has the advantage of not requiring any (or extensive) a priori knowledge or list of channels/frequencies used within a given geography or region or by a particular provider; rather, the presence of sufficient RF power or energy within certain bands of the cable can be used as an indicator of the presence of cable television or DOCSIS signals, or alternatively of confirmation of OTA or satellite signals. Conversely, the absence of such sufficient energy in certain bands may be used to support the hypothesis of no such cable, DOCSIS, OTA or satellite signals within that area (at least being received over the cable connection being tested).

In another embodiment, the RF spectrum present on the tested cable may be divided into two or more portions (e.g., low frequency and high frequency) which may be separately processed by two or more RF detectors. The results of multiple RF detectors can then be logically combined.

Per step 722, the RF power associated with a first designated sub-band of the spectrum of interest is measured, such as via a detector tuned or configured (e.g., via filtration on its front end) to operate in that sub-band. For example, the cable testing device 900 may scan 50 MHz to 800 MHz at equal predetermined intervals of 10 MHz (i.e., 50 MHz, 60 MHz ... 790 MHz, 800 MHz). This method does not require the device to store a list of targeted frequencies; rather, the device 900 can determine the upper and lower limits of the RF spectrum (such as via stored data in the device memory, or the physical limits of the detector), and use the predetermined interval to scan the RF spectrum sub-bands from a lower to upper limit (or vice versa).

In step 726, it is determined whether the full range of the RF spectrum has been scanned (e.g., has the upper limit of the spectrum been reached). If the entire RF spectrum has not been scanned, the method 702 proceeds to step 728.

In step 730, the device 900 tunes (or filters) to the next frequency sub-band within the spectrum. In one embodiment, this constitutes adding a predetermined number (e.g., 10 MHz) to the previous center or nominal frequency.

If in step 726, it is determined that the RF spectrum has been scanned, the method proceeds to step 728, wherein full spectrum power is calculated using the previously collected power measurements of each of the sub-bands. In one embodiment, the full spectrum power level can be calculated by taking an average or a weighted average of all or some of the measurements collected in step 722. In some variants, each sub-band is evaluated "go/no-go" (i.e., the averaged or weighted power for that sub-band is compared to a minimum threshold to determine whether it is sufficient or not). In other variants, the power measurements of the different sub-bands are weighted and averaged, and the average compared to a single threshold value. Yet other approaches will be recognized by those of ordinary skill given the present disclosure.

Figure 8:
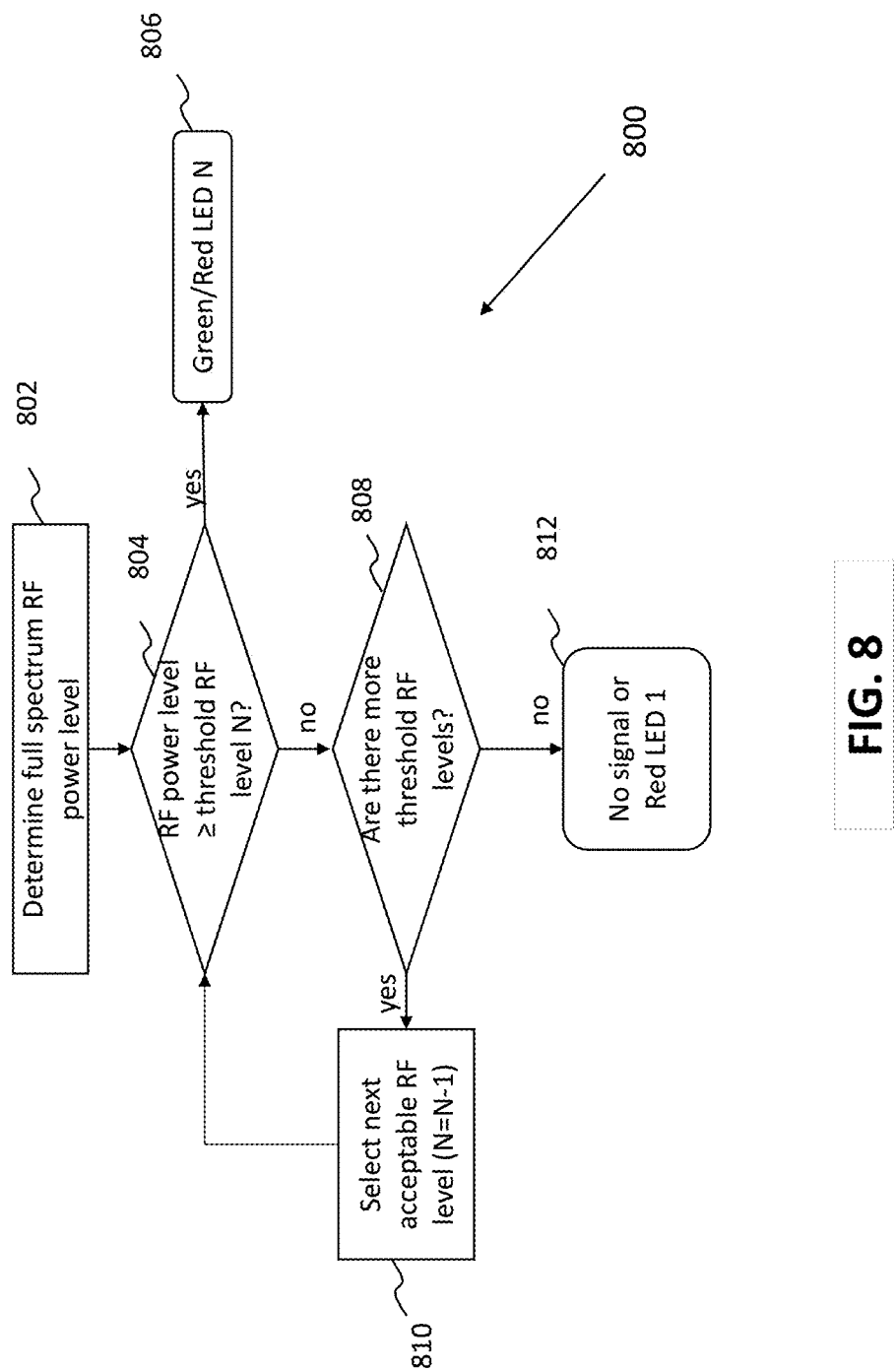
FIG. 8 is a flow chart of another exemplary embodiment of a cable testing method using a full spectrum power measurement, in accordance with the present disclosure.

FIG. 8 illustrates an exemplary method 800 of determining the status of a cable outlet connection and providing (i) cable fail/pass results and (ii) an indication of the measured power level. In one embodiment, the cable testing device 300 can indicate N different power levels and utilize a user interface such as the interface 902B shown in FIG. 9B and the LED driver circuit shown in FIG. 17, both described subsequently herein. In one embodiment, ten (10) different power levels are used, as shown in Table 1 below.

TABLE 1

| LED designator | LED color | DCV on RV_Lvl | RF Power Level on Display dBm | dBmV |
|---|---|---|---|---|
| D1 | Green | 2.1 | −14.75 | 34 |
| D2 | Green | 1.96 | −18.75 | 30 |
| D3 | Green | 1.82 | −22.75 | 26 |
| D4 | Green | 1.68 | −26.75 | 22 |
| D5 | Green | 1.54 | −30.75 | 18 |
| D6 | Green | 1.4 | −34.75 | 14 |

TABLE 1-continued

| LED designator | LED color | DCV on RV_Lvl | RF Power Level on Display dBm | dBmV |
|---|---|---|---|---|
| D7 | Red | 1.26 | −38.75 | 10 |
| D8 | Red | 1.12 | −42.75 | 6 |
| D9 | Red | 0.98 | −46.75 | 2 |
| D10 | Red | 0.84 | −50.75 | −2 |

In step 802 of the method 800, the RF power of the full spectrum is determined, such as by using the method of FIGS. 7 and 7A.

In step 804, the RF power level is compared against a first predetermined threshold RF power level N. In one implementation, the first threshold RF power is 34 dBmV, as indicated in Table 1.

If the measured power level is greater than or equal to a first predetermined threshold power level N (e.g., 34 dBmV for the first loop of the method), then an LED N corresponding to that power level is turned on (step 806). In another embodiment, the LED N corresponding to the power level and all LEDs (1 through N−1) corresponding to lower power levels may be turned on in step 806. The cable testing device 900 can use e.g., the circuitry shown in FIG. 17 to drive ten indicator LEDs (D1-D10) corresponding to ten power levels.

In one embodiment, if the current predetermined threshold power N is higher than a predetermined acceptable power level (i.e., the signal power level indicating that the cable outlet can support cable services), the corresponding LED(s) can be turn green in order to additionally indicate that the cable outlet has passed the cable connection test. If the current predetermined threshold power N is lower than the predetermined acceptable power level, the corresponding LED(s) can be turned red to indicate that the cable outlet has not passed the test.

If per step 804 it is determined that the power level is smaller than the predetermined threshold power, then per step 808 it is determined whether smaller predetermined threshold power levels are available for comparison.

If other threshold power levels are available for comparison, then in step 810, the next largest power level (threshold power N−1) is selected. In one implementation, as shown in Table 1, if the power level is determined to be less than 34 dBmV, the next tested threshold power will be 30 dBmV.

Returning to step 804, the measured power level is compared against the current predetermined threshold power (e.g., 30 dBmV), as described supra.

Steps 804-810 are repeated until the lowest predetermined power level is reached. If the power level is not greater than or equal than the lowest predetermined power level, the cable testing device 900 may indicate that the weakest possible signal is present or that no signal is present (with e.g. a red LED 1 corresponding to the lowest power) per step 812.

Testing Device—

Figure 9:
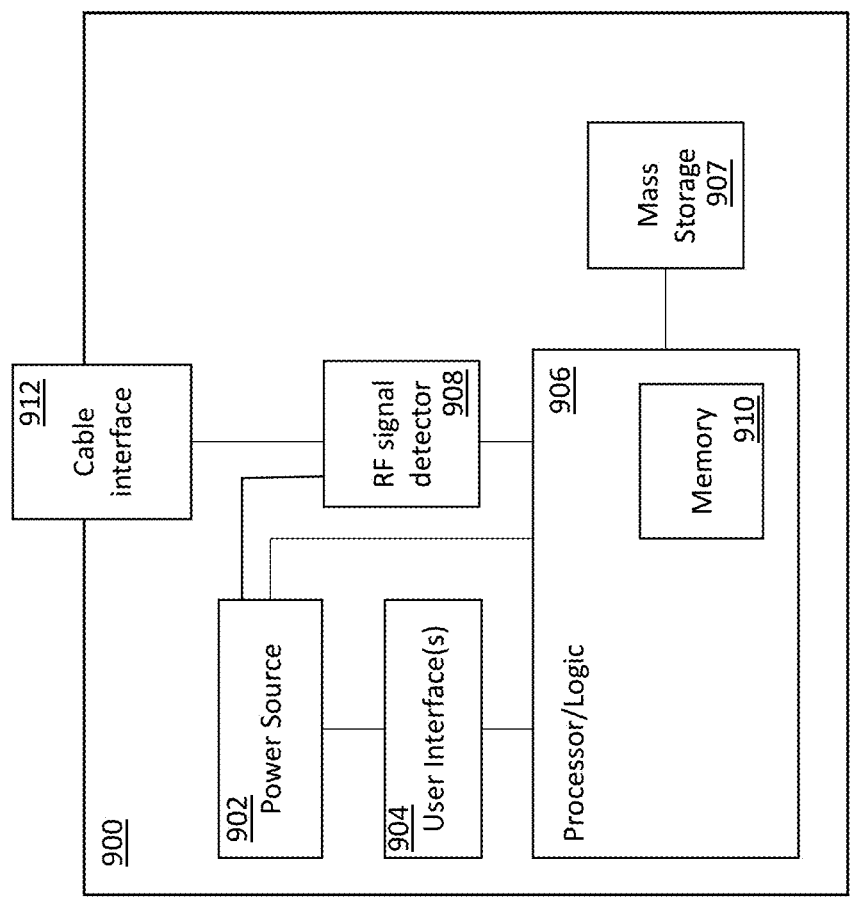
FIG. 9 is a functional block diagram illustrating an exemplary configuration of a cable testing device in accordance with various aspects of the present disclosure.

FIG. 9 illustrates a block diagram of an exemplary portable cable testing device 900 according to aspects of the present disclosure. It will be appreciated that while illustrated as a portable battery-powered consumer device (which may be inexpensively manufactured and distributed to customers or prospective customers of a service provider), the device may also take on other forms, including for example (i) a more capable device integrated with other installer test equipment, (ii) as part of a DSTB, gateway (e.g., residential or IoT gateway), FWA apparatus, or other CPE which will ultimately be installed at the premises, (iii) as a removable card or "dongle" which may be used with another device (e.g., with a USB or micro-USB interface so that it may be plugged into a port of a smartphone or tablet or PC, and interface with application programs thereon).

In one embodiment, the cable testing device 900 may include a digital processor and associated logic 906, one or more user interface elements 904, one or more power sources 902, and a cable interface 912, as well as an RF signal detector 908, mass storage device 907, and internal memory 910 (e.g., internal cache and program memories). In one variant, the device 900 includes multiple RF signal detectors 908 that are configured to evaluate different parts or bands of the RF spectrum (e.g., one for lower frequencies, and one for higher frequencies, or one for certain designated bands ostensibly having certain RF characteristics, and one for other bands with other characteristics). The internal memory or mass storage device 907 may store data relating to one or more lists of target frequencies, and one or more cable testing algorithms (described with respect to FIGS. 2-8). The processor element 906 is configured to execute the a cable testing algorithms stored on internal or external memory.

In one embodiment, the device 900 further includes at least one wireless interface for communication via PAN (e.g., 802.15 or BLE), Wi-Fi (802.11), or other types of wireless connections. In support thereof, the device may include a Bluetooth or PAN wireless chipset with baseband processor (not shown) in communication with processor 906. The device may also include a wireline interface such as a USB or micro-USB interface, for transmission of data and//or electrical power. Such wireline connection may also include e.g., an Ethernet MAC and PoE RJ-45 connector for network interface. In one implementation, the device 900 can communicate locally with an application or program on a personal client device (e.g., mobile device or computer) in order to, e.g. transmit results of cable outlet tests, and/or receive instructions or information, such as updated cable frequency plans, evaluation or analysis algorithms. For instance, in one variant, an EEPROM or similar device on the test device 900 can be "flashed" with a new image including new test and evaluation algorithms via the wireless (or wireline) interface. Moreover, in one variant, the cable testing device 900 is configured to wirelessly receive geographic/location information, such as from the mobile or client device.

In another embodiment, the device 900 may locally communicate with various other wireless-enabled devices located near the cable testing device 900 at time of use. In one variant, the device 900 is configured to identify and cooperate with other cable or service provider network devices that are provided by or associated with a specific cable network operator (e.g., the same operator as associated with the device 900) using the wireless interface. The other network devices may include for example modems, routers, cable settop boxes, gateways, and "smart" remotes.

In one configuration, the device 900 may transmit data to, or receive data from, a network server or other network process by using a local wireless connection to one or more other network devices and/or personal client devices. For instance, the test device 900 may automatically and/or autonomously transmits cable test results to a cable network server (e.g., one maintained in the MSO's headend) via any number of extant network protocols, such that the server can determine the suitability of the tested premises or connection without the user or an installer having to do so. The network server may be configured to, inter alia: (i) evaluate the receiver data relative to a particular premise for sufficiency relative to one or more desired or prescribed services offered by the MSO within that particular geographic region, including returning data to the transmitting device (or designated proxy such as an email address or IP address) indicative of the result and configured to enable generation of a UI or other indication to the user of the results; (ii) evaluate the received data for one premises against prior data for that same premises to identify similarities or anomalies; and/or (iii) evaluate the received data against other data for other premises within the same service group, geographic area or bearing other relationship to the tested premises so as to identify similarities or anomalies.

In another configuration, the device 900 can prompt or provide an option to a user of the device 900 (e.g., via a user interface element) to transmit the cable test results to the server. For instance, the prompt or option is implemented via an application or program on a personal client device communicative with the test device. In another approach, the test device itself includes a UI (such as an LCD touch screen interface) by which the user can select options such as transmission of data.

In yet another configuration, the device 900 may also be able to store (and transmit) test results on a per-connection or connection type basis, such as where the device can differentiate between different connections being tested (whether based on user input or self-sensing circuitry). For instance, certain connections within a premises may be wired differently than others, such as where some outlets are communicative with the coaxial distribution network of the service provider, and others are communicative with an OTA antenna or FWA apparatus only. As such, different test regimes (and results data) may be stored and associated with the different connections.

Figure 9C:
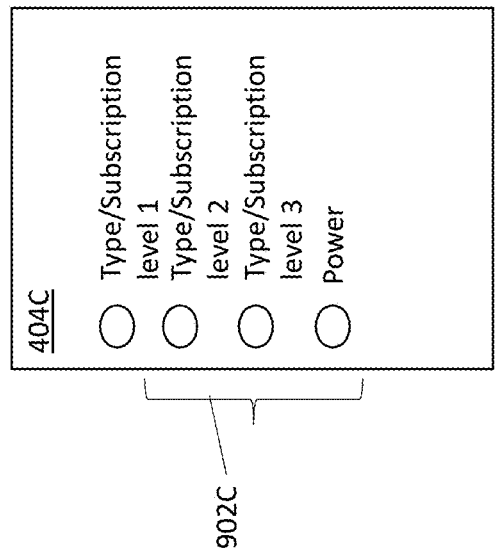
FIGS. 9A-9C are functional block diagrams illustrating various embodiments of visual user interfaces which may be used on a cable testing device of the present disclosure.
Figure 9B:
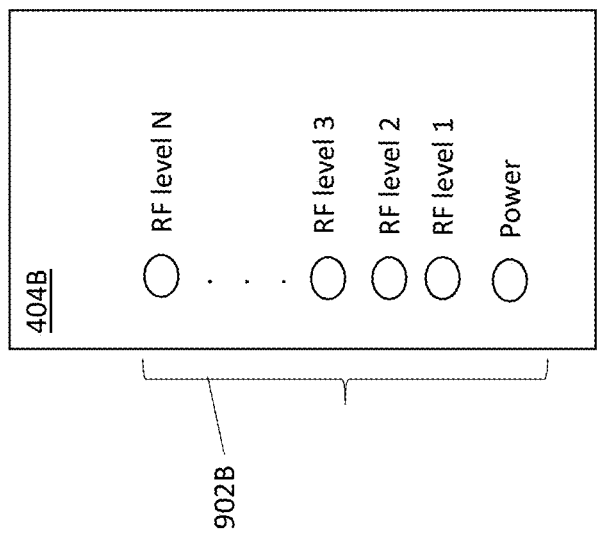
Figure 9A:
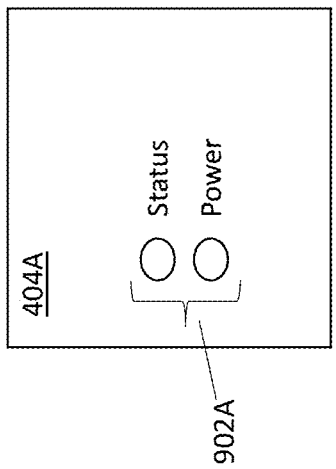

FIGS. 9A-9C illustrate various embodiments of user interface elements 902 of the device 900.

In one embodiment, as shown in FIG. 9A, the user interface 902A includes only two LEDs to indicate the status of the cable and whether the device is powered on. In one embodiment, the status LED is a dual green/read LED configured to provide (i) steady green light to indicate that a cable outlet has passed inspection, (ii) steady red light to indicate that a cable outlet has not passed inspection, and (iii) provide no light or a blinking amber light to indicate that a test is in progress. The power LED may be a single color LED configured to provide (i) steady light to indicate that the device is on, (ii) no light to indicate that the device is off or the battery is dead/not inserted, and (iii) optionally, provide a blinking light to indicate that the device is powered on but the battery is low.

FIG. 9B illustrates a user interface 902B which includes an array of LEDs 902B corresponding to measured RF signal power from level 1 to level N, and one LED to show whether the device 900 is powered on. In one embodiment, the array of RF level indicator LEDs are dual green/red LEDs. In another embodiment, the array of RF level indicator LEDs include a first group of red LEDs and a second group of green LEDs, where the red LEDs correspond to power levels below an acceptable RF spectrum power and the green LEDs correspond to power levels at or above the acceptable RF spectrum power.

FIG. 9C illustrates a user interface 902C which includes an array of LEDs corresponding to three separate cable service subscription levels or service types that may be available for a potential customer/user of a cable network content provider, and a device power indicator (e.g., "basic", "upgraded" and "premium", or "broadband (DOCSIS)", "television", and "VoIP"). The subscription level/type LEDs may be dual green/red LEDs, each configured to provide (i) steady green light to indicate that a cable outlet can support the corresponding cable subscription level or type of service, and (ii) a steady red light to indicate that a cable outlet cannot support the corresponding cable subscription level or type of service.

The device user interfaces of FIGS. 9A-9C can be modified or combined in various other embodiments, as will be appreciated by those of ordinary skill given the present disclosure.

In some embodiments, the test device user interface includes audio and/or haptic elements, such as for use by those visually impaired. In one variant, the device 900 includes speakers, a headphone jack, or a wireless interface configured to connect to wireless headphones. In one such configuration, the device 900 is configured to generate a first audio tone to indicate a cable pass results, and a second tone to indicate a cable fail results. In another embodiment, the device 300 is configured to play tones, tunes or "ring tones", and/or words to give indications of various test results and the power status of the device, similar to the visual LED indicators described in FIGS. 9A-9B.

In another embodiment, instead of or in addition to the user interface element 902 of the device 900, the results of a cable test may be transmitted (wirelessly or via wire) to another electronic device (e.g., a personal client device, a different electronic device associated with the cable service provider) for display. For example, the cable testing device 900 can transmit cable test results to an application on a user smart phone, which can then notify the user of the results via its own display/audio elements of that device.

Figures 10A, 10B:
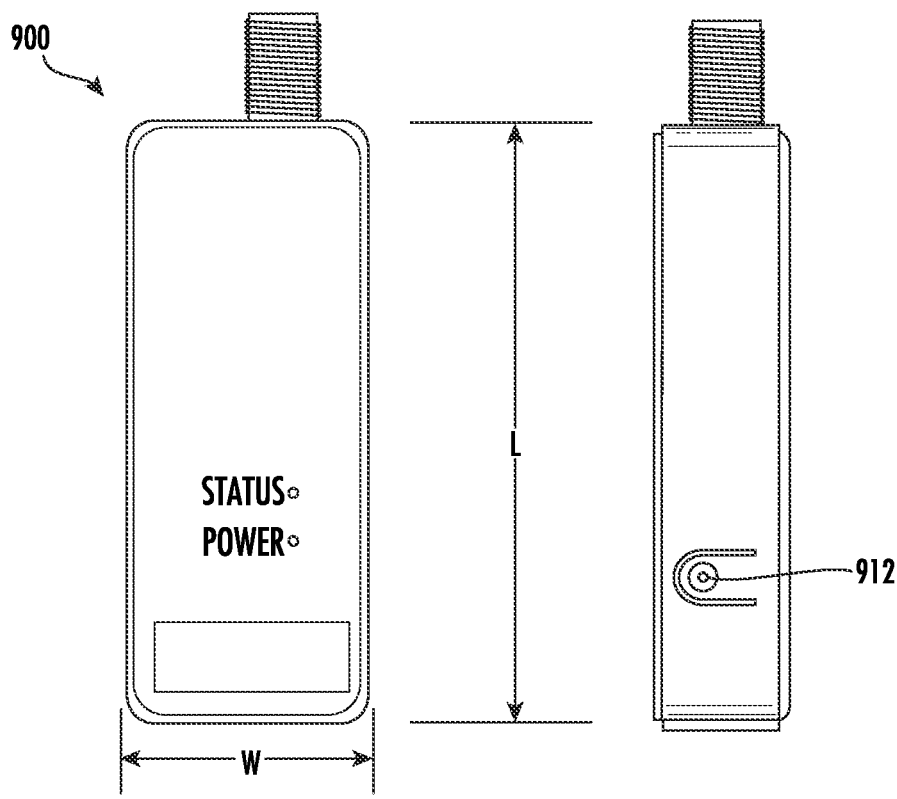
Figure 10C:
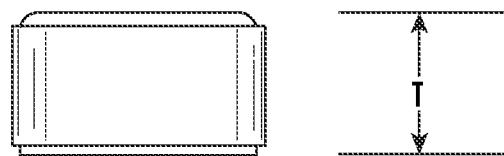
Figure 10I:
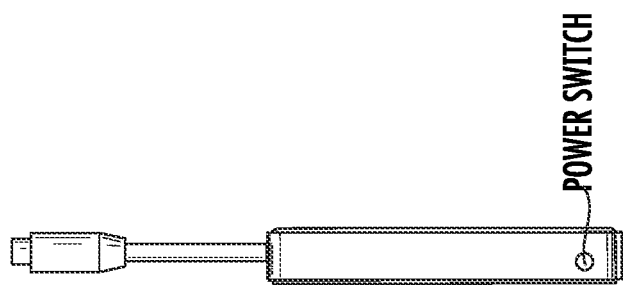
FIGS. 10F-10J are illustrations of another exemplary embodiment of a cable testing device in accordance with the present disclosure.
Figure 10H:
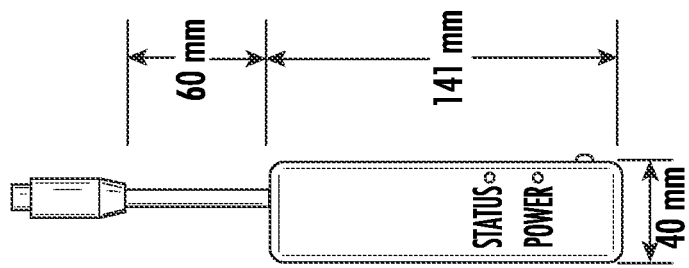
Figure 10J:
Figure 10G:
Figure 10F:
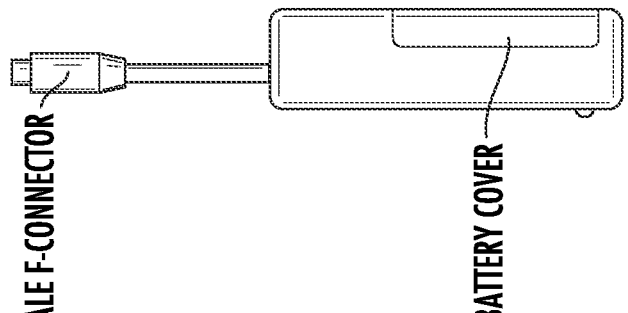

FIGS. 10A-10E show one exemplary embodiment of the physical characteristics of the cable testing device 900. FIG. 10A shows the device 900 from the front, and FIGS. 10B-10E show the device from the left side, top, back, and right side, respectively.

The device 900 may have the shape of a box having width, length, and thickness. In one implementation, the width (W) is approximately 40 mm, the length (L) is approximately 100 mm, and the thickness (T) is approximately 22.5 mm. In other implementations, the device 300 can have different width, length, and/or thickness. In one embodiment, the device 900 has rounded corners.

As shown in FIGS. 10A-10B and 10D-10E, a cable connector (e.g., F-type connector) may protrude from the top of the device.

FIG. 10A is an illustration of the front of the device 900 having two LEDs, a first LED that indicates the status of the cable outlet being evaluated and a second LED that indicates whether the device is powered on or not.

FIG. 10B is an illustration of a side of the device 900. A power switch may be located at the side of the device 900. In other embodiments, the power switch may be located on any of the other sides of the device (including the front, bottom, and top). The power switch may be implemented as a physical button (as shown in FIG. 10B), a toggle switch, or any other type of known switch used in electronic devices.

FIG. 10D illustrates that a battery cover may be located on the back of the device. The device may be configured to be powered by a standard battery (e.g., AAA or AA, or Lithium-based battery) that may be replaced by a user. In other embodiments, the device may have an internal rechargeable power source. For example, the device may have a battery that may be charged wirelessly (e.g., through electromagnetic induction) or through a cable (e.g., using a USB, mini-USB, or other type of connection located on the outside of the device). As yet another alternative, a solar cell or similar photo-electric device may be used.

In other configurations (not shown), the test device 900 may take the form of a cable or dongle that includes the F-type connector discussed above (for connection to a cable outlet), as well as other circuitry and components including a cable and connector interface to a user personal device. For instance, a USB or micro-USB connector or other ubiquitous type of connector may be used to enable data transmission and power delivery between the cable/dongle and the user device; a user simply connects the F-type connector to the outlet being tested, and the USB/mUSB connector to the user device, the latter having an MSO-distributed app (e.g., one downloaded from the MSO website or a third party such as Google Play) which can receive and analyze the test data, and optionally transmit it (or results data derived therefrom) seamlessly to the MSO server previously described.

In some variants, the test device 900 is intended to be a low-cost commodity (or even disposable) device provided by the MSO to customers or prospective customers without expectation of return thereby. Low-cost consumer electronics components are therefore used in such variants to reduce the overhead absorbed by the MSO. Such devices having small form factor and low weight can be mailed or delivered to intended users at low cost as well, including in advance of any proposed installation or upgrade/troubleshooting by service personnel of the MSO. They may also be included in installation kits, such as those including the CPE to be installed.

FIGS. 10F-10J are illustrations of another exemplary embodiment of a cable testing device in accordance with the present disclosure. In this embodiment, a quick connect/disconnect F-type connector "pigtail" is utilized in order to facilitate rapid connection and disconnection by a user (whether subscriber or installer or other) to a connection to be tested. Depending on the configuration of the outlet to be tested, the pigtail may be a male connector adapted for connection to a female connection, or vice versa. As such, the device 900 may also have multiple pigtails, such as for male/female, for different types of connectors/outlets, or other purposes. Likewise, the configurations of FIGS. 10A-10E and 10F-10J can be "blended" or combined, such as where pigtail and non-pigtail connectors are utilized.

FIGS. 11-14 show exemplary circuitry of the cable testing device 900, that may be used to determine the status of a cable outlet connection by evaluating targeted frequencies (e.g., using the method 200 of FIG. 2).

Figure 11:
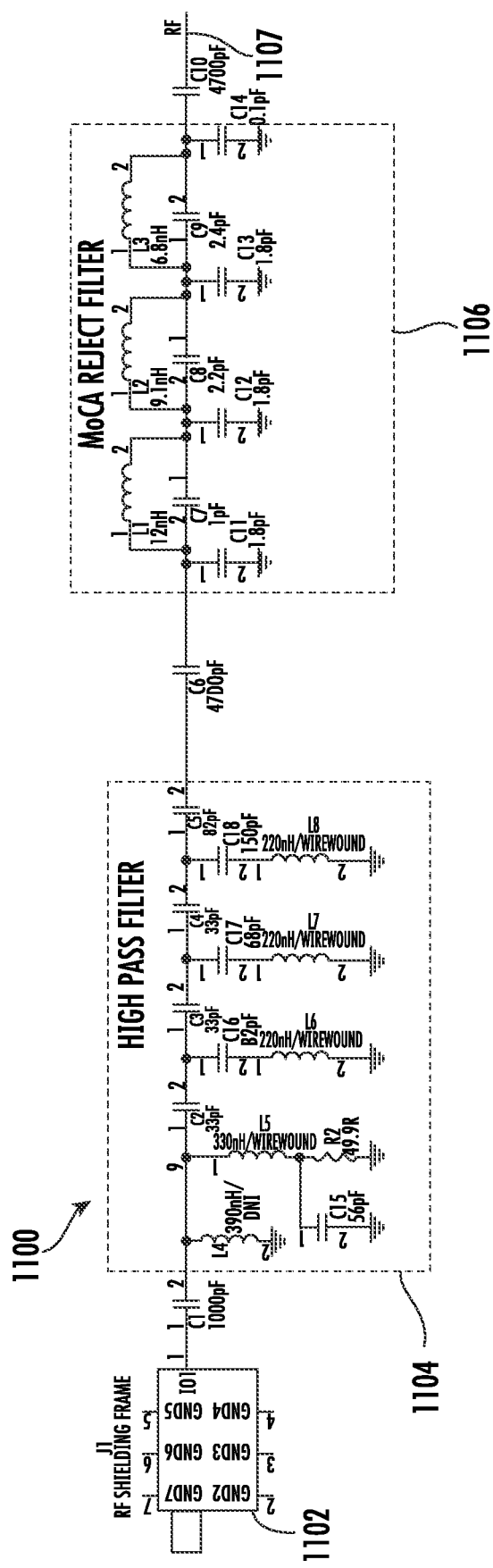
FIGS. 11-14 are circuit schematics of one exemplary embodiment of a cable testing device in accordance with the present disclosure.

As shown in FIG. 11, filter circuitry 1100 on the front end of the detector 900 circuitry includes a connector with shielding frame 1102 for attachment to the outlet to be tested, as well as high-pass and MoCA rejection filter stages 1104, 1006. These stages filter out unwanted lower-frequency bands, as well as MoCA-specific frequency bands (which may interfere with proper determination of the presence of the MSO cable signals, such as by MoCA 2.0 or 2.1 devices which may be installed at the premises.)

Figure 12:
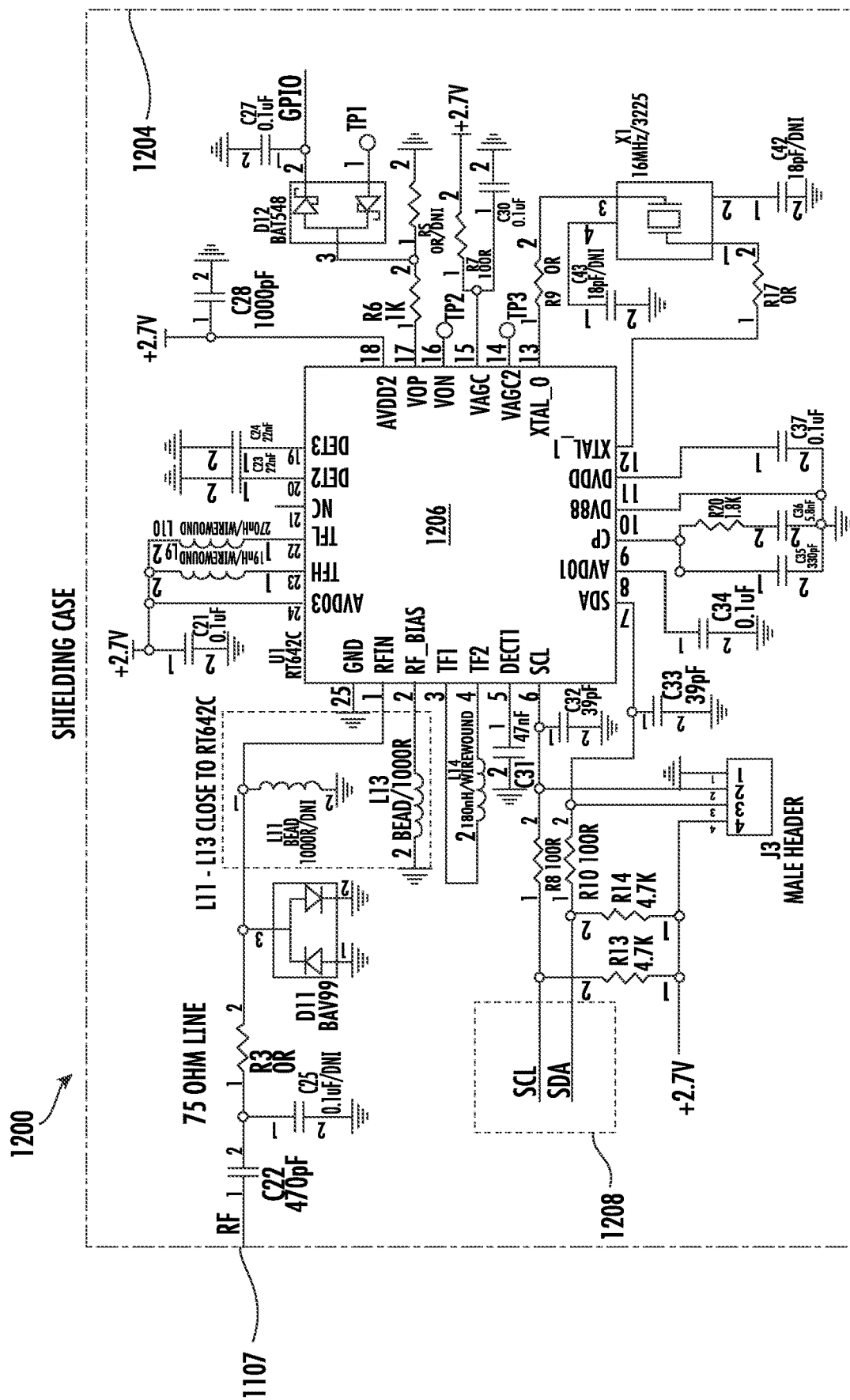

The portion 1200 of the circuit shown in FIG. 12 receives the RF output signal 1107 from the circuit 1100 of FIG. 11, and includes an RF tuner (e.g., U1—implemented via an exemplary RT642C device) that is shielded from the rest of the circuitry and outside electromagnetic interference by a metallic Faraday or other shield mechanism 1204. The received RF signal 1107 is applied to the input pin of the detector (RFIN), without output via the SCL/SDA pins 1208 for interface to the MCU 1306 (FIG. 13), the latter which controls the tuner using the SCL/SDA (standard I2C serial bus) lines and determines if the overall test criteria passes or fails. The MCU also controls the LEDs in the exemplary embodiment.

Figure 13:
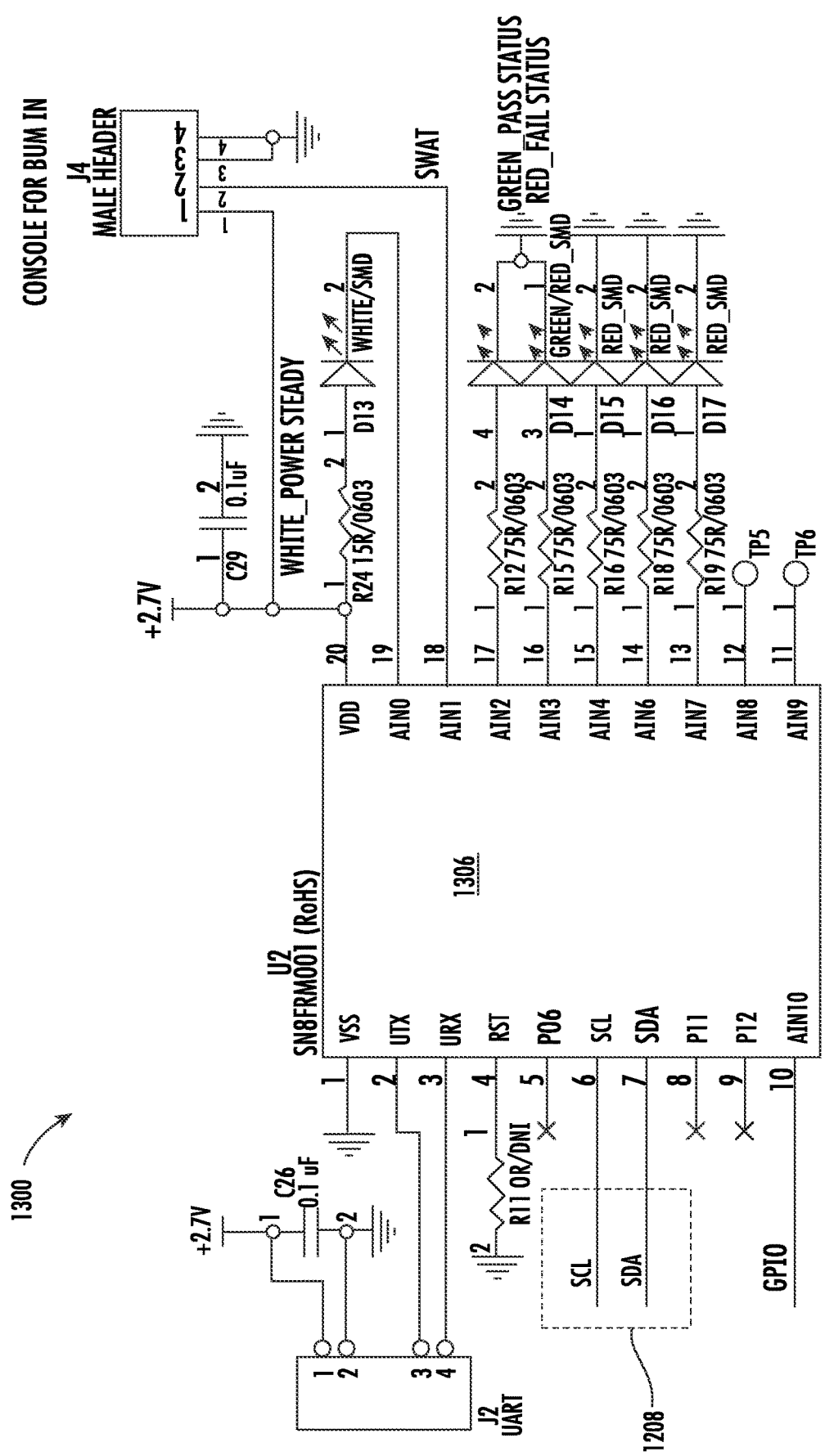
Figure 14:
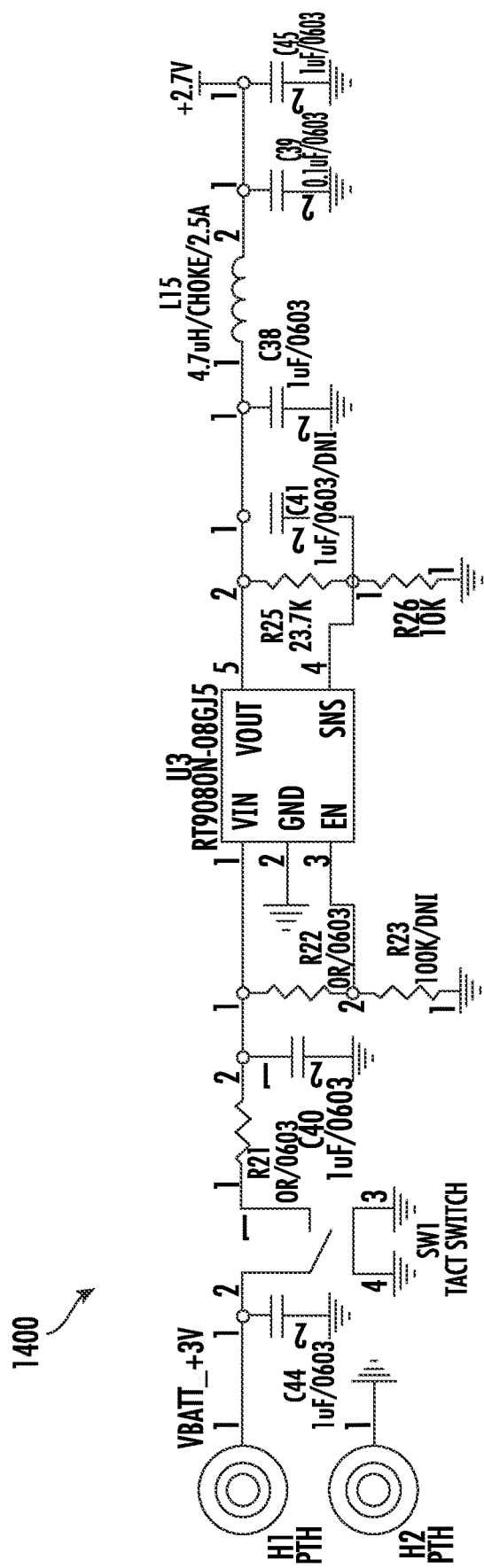

The portion of the circuit 1300 shown in FIG. 13 includes LED driver circuitry and a micro-controller 1306. The circuit shown in FIGS. 11-14 can be configured for instance to drive a white LED for power indication and a dual color LED (green/red) for RF signal status (as shown in FIGS. 9A and 10A). The white LED (D13) can be configured to provide: (i) steady white light when the power is on, (ii) flashing white light at one blink per second, and (iii) no light when the power is off or the battery is dead. The dual color LED (D14-D17) can be configured to provide: (i) flashing amber light at one blink per second to indicate a test/scan being performed, (ii) a green steady light to indicate a test pass, and (iii) a red steady light to indicate a test fail.

In one embodiment, the controller 1306 comprises a Sonix SN8FRM001 Flash MCU (microcontroller), although other devices may readily be substituted. In one implementation, the logic/algorithm of selectively evaluating different frequency signals from the provided RF input and then determining whether the cable has passed or failed the test, is stored on the MCU chip (U2) 1306.

Figure 15:
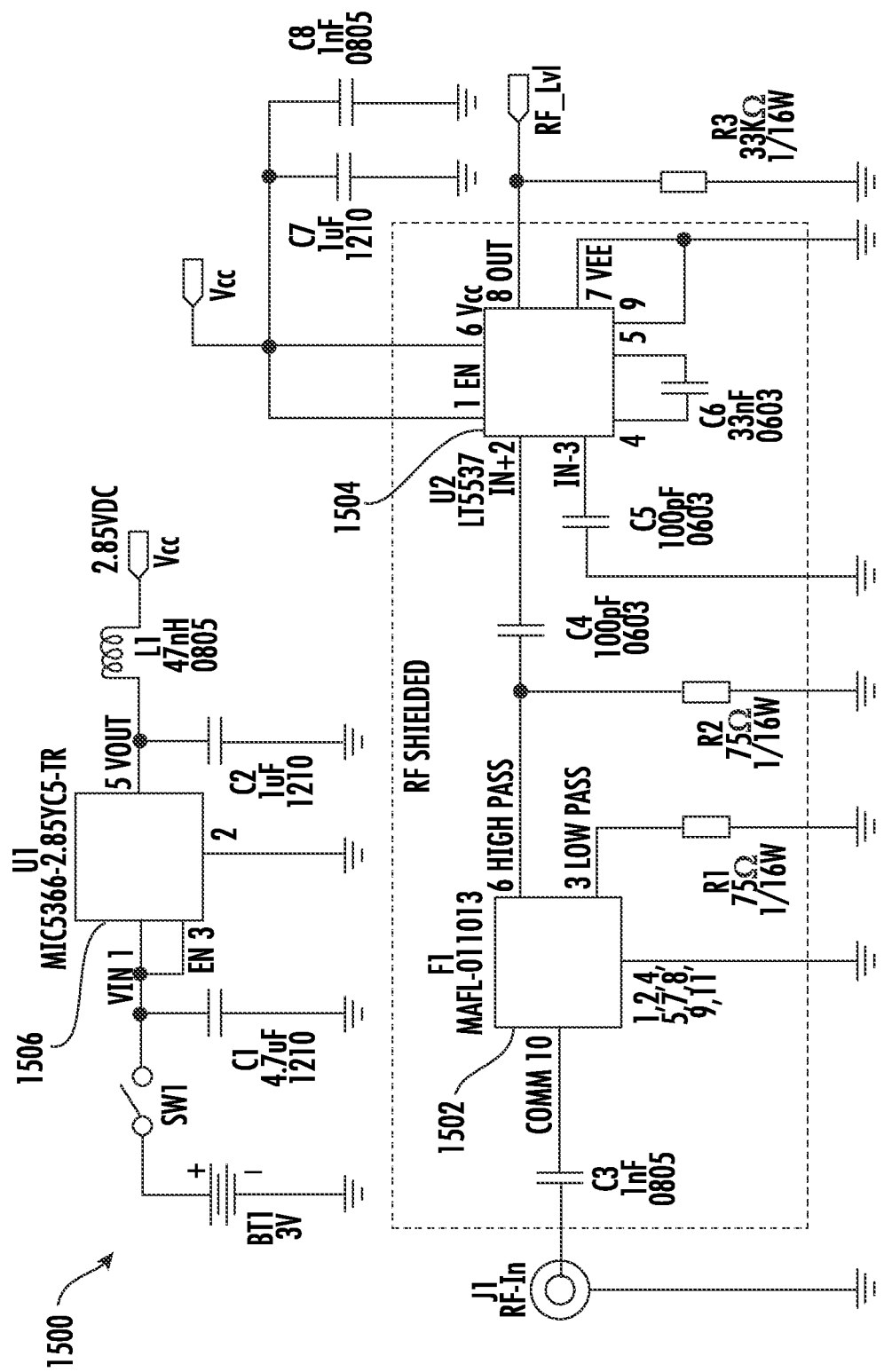
FIGS. 15-17 are circuit schematics of another exemplary embodiment of a cable testing device in accordance with the present disclosure.
Figure 16:
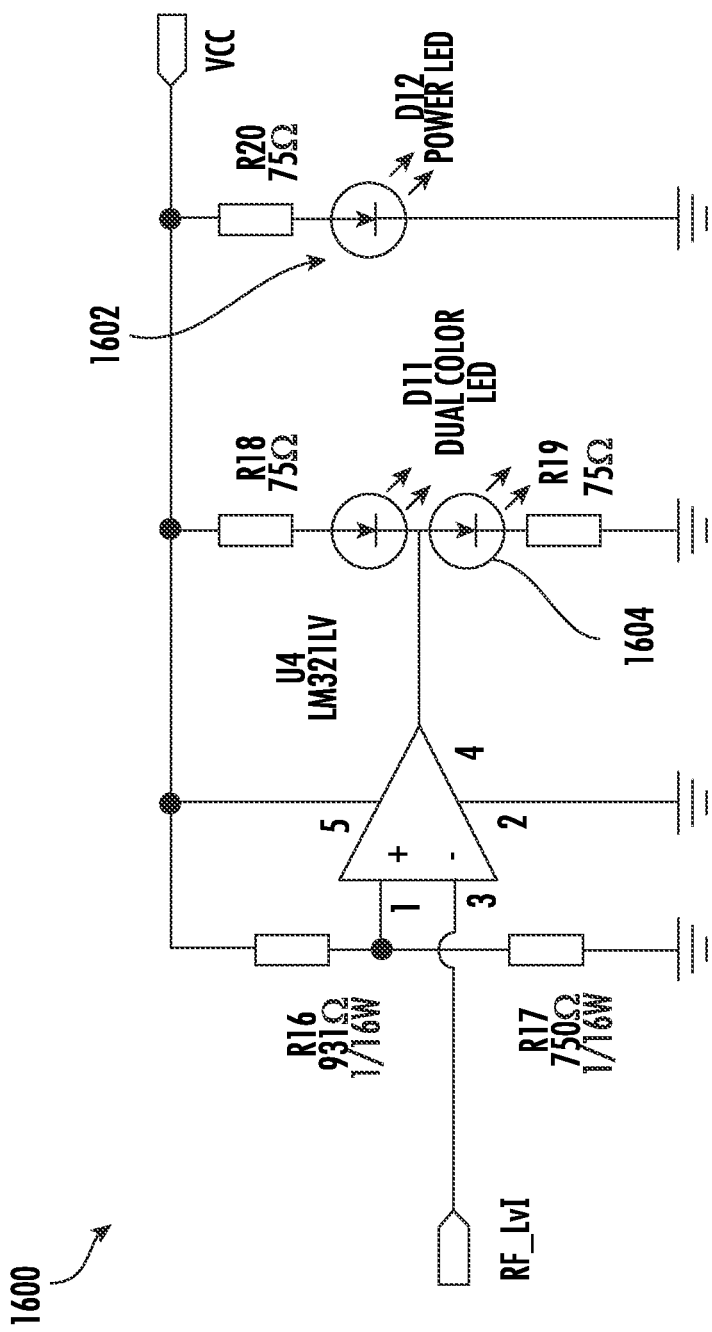
Figure 17:
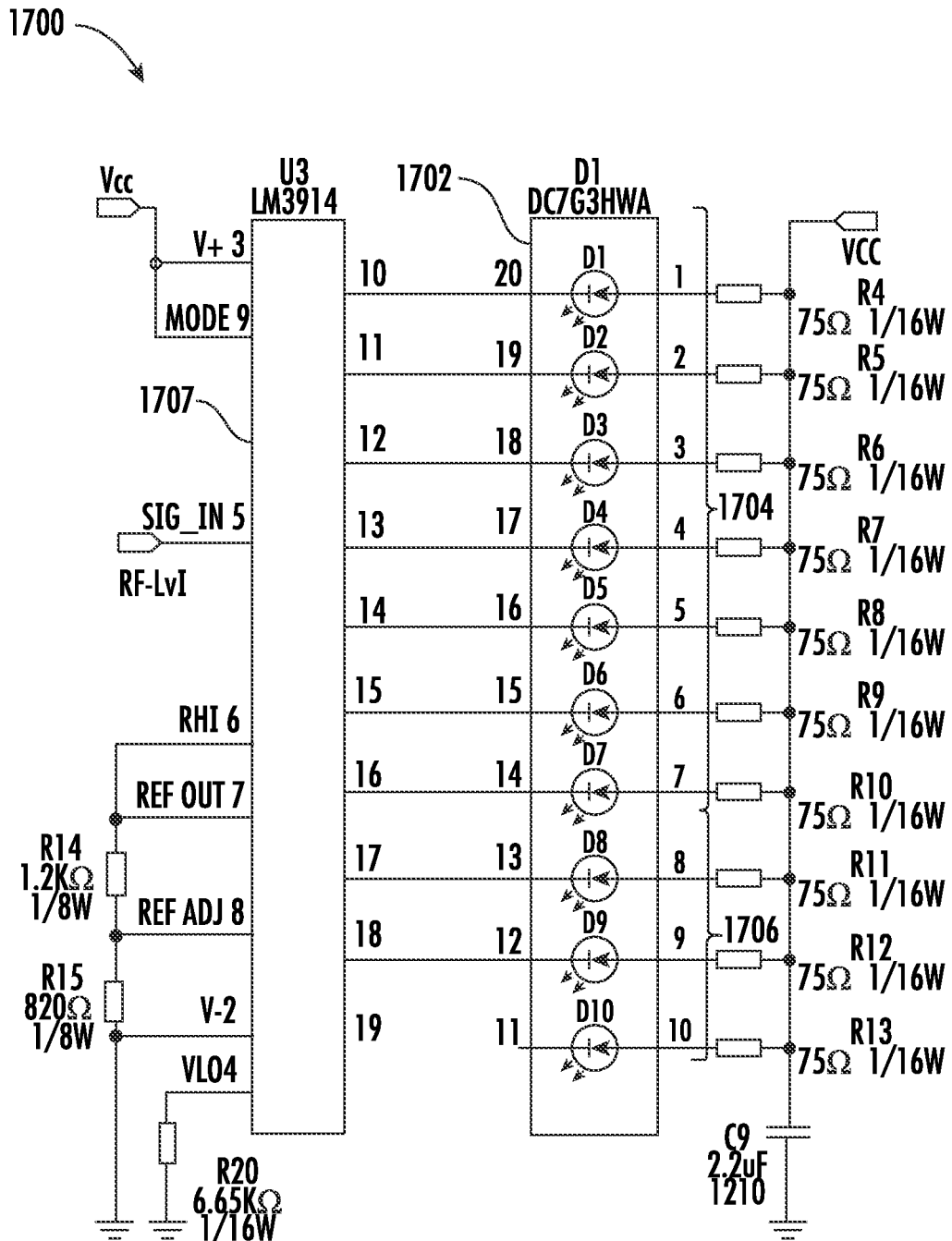

FIGS. 15-17 show exemplary circuitry for use within the cable testing device 900, that may be used to determine the status of a cable outlet connection by evaluating a full RF spectrum.

FIG. 15 illustrates another embodiment of the test device circuitry, including a shielded RF detector circuit 1500 that includes a filter element (F1) 1502 (such as the illustrated MAFL-011013 RF diplexor diplexer 5 MHz~42 MHz/54 MHz~1 GHz 11 SMD Module) coupled to the input connector (e.g., F-type connector J1) that selectively isolates a portion of the spectrum in which the detector is interested, and an RF detector chip (U2) 1504, such as the illustrated LT5537 wide dynamic range RF/IF log detector. The exemplary LT5537 is a wide dynamic range detector which, in the embodiment of FIGS. 15-17, is utilized in place of the tuner of the embodiment of FIGS. 11-14. Rather than tuning and measuring individual frequencies as in the embodiment of FIGS. 11-14, the embodiment of FIGS. 15-17 measures the entire RF spectrum at once. The circuit also includes a MIC5365/6 advanced general purpose linear regulator 1506 for power regulation.

FIG. 16 illustrates an LED driver that may be used in conjunction with the circuitry of FIG. 15 to drive LEDs to indicate (i) portable device 900 power status, and (ii) cable test results (e.g., obtained using the method 200 of FIG. 2). A first LED (D12) 1602 can be configured to provide (i) steady light when the power is on, and (ii) no light when the power is off or the battery of the device is dead. A second (dual color) LED (D11) 1604 can be configured to provide (i) a green steady light to indicate a test pass and (ii) a red steady light to indicate a test fail, based on the RF level signal at the input of the op amp (U4).

FIG. 17 illustrates an LED driver that may be used in conjunction with the circuit of FIG. 15 to drive an array of LEDs 1702 to indicate cable test results and measured RF power level provided by e.g., use of the method 800 of FIG. 8 as previously described with respect to Table 1. In one embodiment, (i) the first seven LEDs (D1-D7) 1704 correspond to power levels that are all above an acceptable threshold and which provide a green light indication, and (ii) the last three LEDs (D8-D10) 1706 correspond to the lowest three power levels which are below the acceptable threshold and provide red light, based on RF level input at the comparator device (U3) 1707.

Network Architecture and Frequency Selection—

Figure 18:
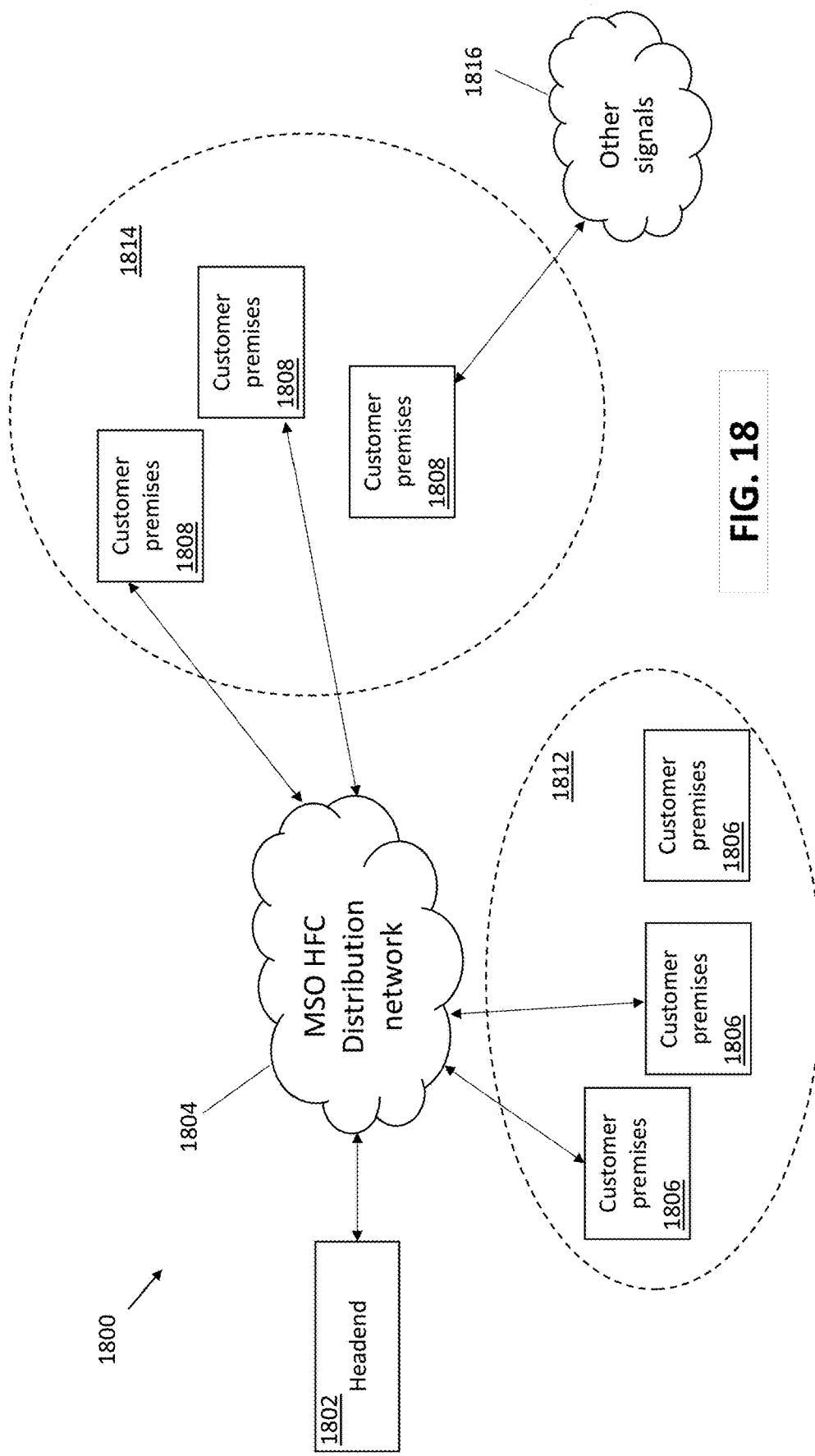
FIG. 18 is a logical block diagram of an exemplary network architecture useful for illustrating various aspects of the present disclosure.

FIG. 18 illustrates a simplified logical block diagram of a multiple systems operator (MSO) network architecture 1800, wherein the MSO is a cable service/content provider delivering services over an HFC network. The methods and apparatus of the present disclosure may be implemented by the MSO to determine whether one or more cable outlets within various customer premises 1806, 1808 are (i) connected to (i.e., in signal communication with) the MSO HFC distribution network 1804 and (ii) if connected, whether the cable connection is acceptable (i.e., of sufficient quality such that sufficient RF signal strength can be achieved) to support services provided by the MSO. It will be appreciated that, depending on the types of services to be delivered, the test for acceptability may vary, such as where lower data-rate or more error-tolerant applications may feasibly be supported by lower SNR signals as compared to higher data rate/higher order modulation signals.

Depending on each individual premises, one or more cable outlets within customer premises (or potential/future customer premises) 1806, 1808 can be (i) adequately connected to the MSO distribution network 1804; (ii) inadequately connected (e.g., connect to the MSO infrastructure, but with degraded capability such as due to degraded cable or connector condition, presence of high levels of RF interference, etc.); (iii) not connected to anything (e.g., open/broken cable, or failed or unconnected F-type connector); or (iv) connected to various other networks or devices 1816 (e.g., through satellite dish or over-the-air antenna, MoCA installation, etc.).

The cable testing device 900 described in the present disclosure can accordingly be used to inspect a cable outlet to determine whether an adequate connection to the MSO network exists, and/or for subsequent troubleshooting depending on configuration of the device.

The different customer premises 1806, 1808 may be located within a plurality of markets or service areas 1812, 1814. The service areas may generally correspond to different geographical regions, although other types of differentiation are contemplated by the present disclosure (e.g., different users connected to different sub-networks within a common topology, different users associated with different frequency use plans, etc.). In one embodiment, different versions or configurations of the cable testing device 900 are used to test cable outlets connections in the different markets. For example, a first configuration of the device 900 is used to test cable connections within first customer premises 1806 located within a first geographical market 1812, and a second somewhat different configuration of the device 900 is used to test cable connections of second customer premises 1808 within a second geographical market 814. The different versions or configurations of the cable testing device 100 can include different target frequencies/bands, different exclusion frequencies/bands (e.g., corresponding to different OTA broadcaster profiles), different testing algorithms, power or other parameter thresholds, or yet other differences.

Figure 19:
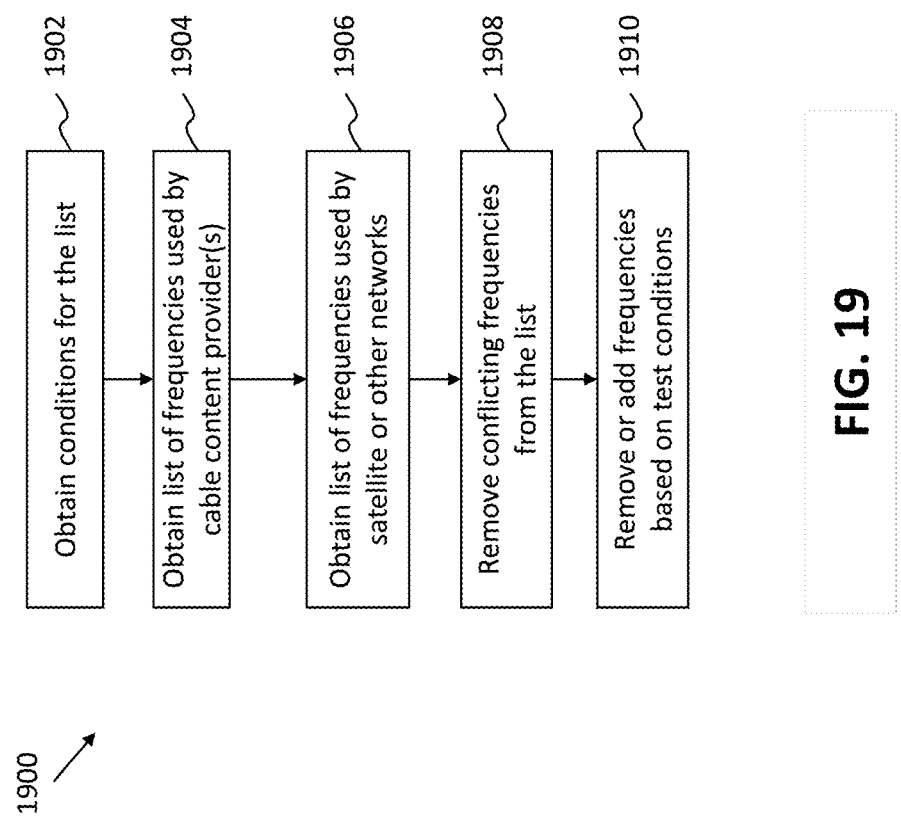
FIG. 19 is a flow chart of an exemplary method of generating a list of targeted frequencies for use in cable testing method in accordance with aspects of the present disclosure.

FIG. 19 illustrates a method 1900 of generating a list of frequencies to be used by a cable testing device 900.

At step 1902, the method 1900 comprises first obtaining the conditions required for the list of frequencies. In one embodiment, the conditions can include one or a combination of: (i) the particular cable market or geographical area in which the list will be used, (ii) the type or subscription level of a cable content provider's signals that will be evaluated using the list (e.g., DOCSIS broadband services, basic cable, premium subscription, etc.), (iii) a desired number of frequencies to be used for confirmation/analysis, and (iv) desired bands of frequencies.

The cable market can be a local market (e.g., neighborhood, town, city) or a greater geographical region (e.g., northwest region of the United States, all of Canada, etc.). Cable content provider networks may use different frequencies in different markets based on, for example, the adopted frequency plan, availability of spectrum (e.g., typically below 800 MHz, but perhaps as high as 1.2 GHz or 1.6 GHz in next generation deployments), and/or government regulations, although frequency use is generally consistent across providers.

The subscription level or type of services to be provided may give an indication of the channel frequencies used by a cable provider for a specific type or level of service within the geographical region; e.g., frequencies used to deliver certain services such as basic-level cable to residents of a given locale may be quite limited and disposed within one portion of the total cable available spectrum). Similarly, DOCSIS US/DS services may utilize certain prescribed frequency bands on the cable.

In one embodiment, the number of frequency channels included in the list may be restricted in order to make sure the cable test can be performed quickly enough. In another embodiment, a minimum number of frequency channels may be specified in order to ensure that the cable test has adequate data to give a sufficiently accurate or reliable result. As previously noted, these lists may also in some variants be varied dynamically by the logic of the device 900 itself, such as where the minimum number of frequencies to be measured is dynamically increased upon sensing a comparatively high fraction of test failures or ambiguous results.

The types of frequencies may also be limited, e.g. to lower or higher frequencies or such that the individual tested frequency ranges are non-overlapping.

In step 1904, a first list of frequencies used by the target cable service/content provider network is obtained (from the cable provider, via data stored in the memory of the device 900, public records, etc.). If the conditions of step 902 include geographical region and/or type/subscription level limitations, the list of frequencies is selected based thereon.

In step 1906, a second list or profile of frequencies used by confounding satellite, over-the-air TV, and/or other types of content providers or sources is obtained.

In step 1908, if any conflicting frequencies are found (e.g., frequencies present on the first and second lists, or overlap in non-identical but similar bands), the conflicting frequencies or bands are removed from the first list.

In step 1910, the first list may be evaluated and modified to make sure it conforms to at least some conditions provided in step 1902. For example, if there are too many frequencies, some of them may be removed (randomly, according to a priority structure, or in accordance with other conditions or considerations). On the other hand, if a greater number of frequencies is required to perform an accurate test (e.g., based on a first-pass test indicating unsuitable or ambiguous results), some of the frequencies removed in step 1908 may be added back in. In one embodiment, the conditions or considerations for frequency selection are ranked by importance such that, if not all of them can be met, one takes precedence over another.

In another embodiment, several lists of frequencies may be pre-generated and stored in a cable testing device 900. The device 900 may then select one or more of the lists based on current/local conditions of the cable test, such as based on user input, an initial testing result (e.g., an initial scan of the entire frequency band or portions thereof), input from a location positioning system such as a GPS receiver of the device 900, or other.

Additional Considerations

It will be appreciated that while the foregoing exemplary embodiments of testing methods, and methods of operation of the testing device 900, are described primarily in terms of downstream signals present on a given connection (e.g., those transmitted from a cable MSO headend or distribution node toward the customer CPE), the various aspects of the present disclosure may be used for other signals as well. For example the methods and testing device 900 may be configured to test signals issued by a customer premises CPE (e.g., DSTB or gateway or DOCSIS modem) towards the headend. For instance, in one such variant, baseband signals generated by an FWA CPE and transmitted via coaxial cable toward a roof-top radio head and antenna array can be evaluated; e.g., at the radio head coaxial cable termination, in order to determine if suitable signals are present. Similarly, signals generated by a DSTB, gateway, or MoCA device within a premises (sourced by the main coaxial cable "drop" or feed to the premises, or a rooftop FWA device) and transmitted toward another room/outlet within a "tree" or other topology within the premises can be tested using the methods/apparatus described herein.

Moreover, while the testing methods and apparatus of the disclosure are described with respect to wall-plate type outlets (e.g., those mounted within drywall or other surfaces of the premises), they can also be adapted for application to F-type or similar connections present on consumer electronic devices such as gateways, televisions, etc., such as where the electronic device includes a connector to enable it to act as a source for other devices (e.g., a pass-through or repeater connection).

Additionally, as previously referenced, the test device 900 may include an RF source device (e.g., an oscillator and RF front end or other RF signal generator) so that the device may act as a test source for another detector device (whether another test device 900 or one of different configuration) for "end to end" cable testing. For example the source device may be connected to the MD or ingress connection point for the premises, while the recipient or detector device is placed at one or more outlets within the premises, in effect performing RF continuity testing on the coaxial cabling within the premises.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. An electronic device configured to evaluate a cable outlet connection at a premises, the electronic device comprising:
   a processing apparatus;
   a physical cable interface in communication with the processing apparatus; and
   a storage device in data communication with the processing apparatus and having at least one computer program configured to, when executed on the processing apparatus, cause the electronic device to:
      receive a plurality of radio frequency (RF) signals;
      determine respective power levels of at least a portion of the plurality of RF signals, wherein the determination of the respective power levels of the at least portion of the plurality of RF signals comprises:
         (i) receipt of a first plurality of power measurements of respective ones of signal within a first targeted frequency range; and
         (ii) a computation of an average of the first plurality of power measurements to generate an average power measurement associated with the first targeted frequency range;
      determine at least one signal characteristic of the at least portion of the plurality of RF signals; and
      based at least on the power levels and the at least one signal characteristic, determine whether the cable outlet connection is suitable for delivery of one or more prescribed digital services provided from a service provider infrastructure to the premises.

2. The electronic device of claim 1, wherein the at least one signal characteristic comprises an order of a QAM (quadrature amplitude modulation) in-phase and quadrature (I-Q) constellation used for modulating the at least a portion of the plurality of RF signals.

3. An electronic device configured to evaluate a cable outlet connection at a premises, the electronic device comprising:
   a processing apparatus;
   a physical cable interface in communication with the processing apparatus; and
   a storage device in data communication with the processing apparatus and having at least one computer program configured to, when executed on the processing apparatus, cause the electronic device to:
      receive a plurality of radio frequency (RF) signals;
      determine respective power levels of at least a portion of the plurality of RF signals;
      determine at least one signal characteristic of the at least portion of the plurality of RF signals; and
      based at least on the power levels and the at least one signal characteristic:
         determine whether at least one RF signal of at least one prescribed target frequency meets a prescribed criterion, the determination of whether the at least one RF signal of the at least one prescribed target frequency meets the prescribed criterion comprising a determination of whether RF signals of respective ones of prescribed target frequencies each meet at least one of (i) a prescribed power level, or (ii) a prescribed frequency versus power profile; and determine whether the cable outlet connection is suitable for delivery of one or more prescribed digital services provided from a service provider infrastructure to the premises, the determination of whether the cable outlet connection is suitable comprising:

performance of a count of a number of the RF signals which meet the prescribed at least one of (i) the prescribed power level, or (ii) the prescribed frequency versus power profile; and performance of a comparison of the counted number to a prescribed acceptance value.

4. The electronic device of claim 3, wherein the prescribed acceptance value is based at least on at least one of: (i) a number of RF channels used by over-the-air (OTT) broadcast television within a prescribed geographic region where the premises is located, or (ii) a number of RF channels used by the service provider.

5. The electronic device of claim 4, wherein the prescribed acceptance value is selected to be (i) greater than the number of RF channels used by the OTT broadcast television, and (ii) less than the number of RF channels used by the cable network service provider.

6. The electronic device of claim 3, wherein the at least one signal characteristic comprises an order of a QAM (quadrature amplitude modulation) in-phase and quadrature (I-Q) constellation used for modulating the at least a portion of the plurality of RF signals.

7. An electronic device configured to evaluate a cable outlet connection at a premises, the electronic device comprising:

a processing apparatus;

a physical cable interface in communication with the processing apparatus; and a storage device in data communication with the processing apparatus and having at least one computer program configured to, when executed on the processing apparatus, cause the electronic device to:

receive a plurality of radio frequency (RF) signals;

determine respective power levels of at least a portion of the plurality of RF signals;

determine at least one signal characteristic of the at least portion of the plurality of RF signals; and based at least on the power levels and the at least one signal characteristic:

(i) determine whether the cable outlet connection is suitable for delivery of one or more prescribed digital services provided from a service provider infrastructure to the premises; and (ii) determine whether an RF signal of at least one prescribed target frequency meets a prescribed criterion, wherein the determination of whether the RF signal at the at least one target frequency meets the prescribed criterion comprises a comparison of a) a measured average power level of the RF signal within a prescribed frequency band and over a prescribed temporal interval against b) a threshold acceptance criterion.

8. The electronic device of claim 7, wherein the determination of whether the RF signal at the at least one target frequency meets the prescribed criterion further comprises: (1) determination of a power level profile of the RF signal as a function of frequency within the prescribed frequency band, and (2) algorithmic analysis of the determined power level profile to generate characterization data relating thereto.

9. The electronic device of claim 8, wherein the algorithmic analysis of the determined power level profile to generate the characterization data relating thereto comprises a comparison of at least portions of the characterization data to data associated with a predetermined template or profile.

10. An electronic device configured to evaluate a cable outlet connection at a premises, the electronic device comprising:

a processing apparatus;

a physical cable interface in communication with the processing apparatus; and a storage device in data communication with the processing apparatus and having at least one computer program configured to, when executed on the processing apparatus, cause the electronic device to:

receive a plurality of radio frequency (RF) signals;

determine respective power levels of at least a portion of the plurality of RF signals;

determine at least one signal characteristic of the at least portion of the plurality of RF signals; and based at least on the power levels and the at least one signal characteristic:

determine whether the cable outlet connection is suitable for delivery of one or more prescribed digital services provided from a service provider infrastructure to the premises; and determine whether an RF signal of at least one prescribed target frequency meets a prescribed criterion;

wherein the determination of whether the cable outlet connection is suitable for the delivery of the one or more prescribed digital services comprises a determination of whether a threshold number of RF signals within a plurality of contiguous or consecutive RF frequency bands meet the prescribed criterion.

11. The electronic device of claim 10, wherein the plurality of contiguous or consecutive RF frequency bands comprises a plurality of contiguous or non-contiguous RF frequency bands disposed within a prescribed sub-band of a frequency spectrum available on the service provider infrastructure.

12. The electronic device of claim 11, wherein the prescribed sub-band of the frequency spectrum available on the service provider infrastructure comprises a sub-band having at least one of a prescribed disability factor or prescribed performance influencing factor associated therewith, the at least one prescribed disability factor or prescribed performance-influencing factor comprising at least one of: (i) higher or lower signal attenuation that an attenuation associated with other sub-bands of the frequency spectrum; or (ii) higher or lower RF noise from one or more noise sources external to the service provider infrastructure that other sub-bands of the frequency spectrum.

13. The electronic device of claim 10, wherein the at least one signal characteristic comprises an order of a QAM (quadrature amplitude modulation) in-phase and quadrature (I-Q) constellation used for modulating the at least a portion of the plurality of RF signals.

14. A computerized method of evaluating a signal at a premises connection point, the computerized method comprising:

obtaining measurement data relating to at least one parameter of respective ones of a plurality radio-frequency (RF) signals at respective ones of a plurality of target frequencies, the plurality of target frequencies having been selected based at least on location information relating to the premises;

algorithmically evaluating at least a portion of the measurement data using at least acceptance criteria data; and based at least on the algorithmic evaluating, determining whether the premises connection point can support at least a first type of digital service provided from a service provider infrastructure to the premises;

wherein the plurality of target frequencies are selected by:
  obtaining a first data structure of frequencies, the first data structure comprising all frequencies used by the service provider infrastructure within a first geographic region;
  obtaining a second data structure of frequencies, the second data structure comprising all frequencies used by one or more satellite service providers within the first geographic region; and
  removing any frequencies on the second data structure from the first data structure to generate a first data structure of target frequencies, the first data structure of target frequencies being associated with the first geographic region.

15. The computerized method of claim 14, wherein the plurality of target frequencies are further selected by:
  obtaining a third data structure of frequencies, the third data structure comprising all frequencies used by the service provider infrastructure within a second geographic region;
  obtaining a fourth data structure of frequencies, the fourth data structure comprising all frequencies used by satellite service providers within the second geographic region; and
  removing any frequencies of the fourth data structure from the third data structure to generate a second data structure of target frequencies, the second data structure of target frequencies being associated with the second geographic region; and
  wherein the selection of the plurality of target frequencies comprises selecting from at least the first data structure of target frequencies and the second data structure of target frequencies based at least on the location information relating to the premises being within either the first geographic region or the second geographic region.

16. The computerized method of claim 14, wherein the selection of the plurality of target frequencies based on the location information relating to the premises comprises:
  accessing a location determination device of a portable computerized measurement apparatus to obtain data relating to a then-current location of the portable computerized measurement apparatus; and
  based at least on the obtained data relating to the then-current location, correlating the then-current location to either the first geographic region or the second geographic region.

17. An electronic apparatus comprising:
  at least one user interface element, the at least one user interface element comprising an array of light emitting devices (LEDs), wherein each of the array of LEDs is associated with a power measurement;
  processor apparatus in communication with the at least one user interface element;
  connector apparatus configured to interface with a premises signal or data connection; and
  a radio frequency detection apparatus in communication with the processor apparatus and the connector apparatus, and configured to cause the electronic apparatus to:
    receive a plurality of radio frequency (RF) signals within respective ones of a plurality of RF bands via the connector apparatus;
    measure power levels of each of the plurality of RF signals to produce power level data;
    utilize the power level data to calculate an average power level for each of the plurality of RF bands;
    cause at least some the plurality of LEDs to provide a steady light to indicate the calculated average power level for each of the plurality of RF bands;
    utilize an evaluation algorithm on the power level data to generate test result data; and
    cause the electronic apparatus to provide an indication of the test result data via the at least one user interface element.

18. The electronic apparatus of claim 17, wherein:
  the at least one user interface element comprises a dual-color light emitting device (LED); and
  the processor apparatus is further configured to cause the electronic apparatus to:
    cause the dual-color LED to provide a steady green light to indicate a positive cable outlet test result;
    cause the dual-color LED to provide a steady red light to indicate a negative cable outlet test result; and
    cause the dual-color LED to provide a blinking light to indicate a cable test in progress.

19. The electronic apparatus of claim 17, further comprising a wireless interface in data communication with the processor apparatus, and wherein:
  the electronic apparatus is associated with a cable service provider; and
  the electronic apparatus is configured to establish wireless data communication to at least one other device of the cable service provider to transact at least a portion of the test result data therewith.

20. The electronic apparatus of claim 17, further comprising a wireless interface in data communication with the processor apparatus, and wherein:
  the electronic apparatus is associated with a cable service provider; and
  the electronic apparatus is configured to establish wireless data communication to at least a user wireless-enabled device to transact at least the test result data therewith, the user wireless-enabled device comprising an application computer program adapted for data communication with a server apparatus of, or operated for, the cable service provider.

* * * * *